US012610266B2

(12) United States Patent
Abraham et al.

(10) Patent No.: US 12,610,266 B2
(45) Date of Patent: Apr. 21, 2026

(54) METHOD AND WIRELESS NETWORK FOR SUPPORTING MULTIPLE MEASUREMENT GAPS IN WIRELESS NETWORK

(71) Applicant: Samsung Electronics Co., Ltd., Suwon-si (KR)

(72) Inventors: Aby Kanneath Abraham, Bangalore (IN); Vinay Kumar Shrivastava, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/903,588

(22) Filed: Sep. 6, 2022

(65) Prior Publication Data

US 2023/0077965 A1     Mar. 16, 2023

(30) Foreign Application Priority Data

Sep. 6, 2021   (IN) ............................. 202141040399
Aug. 22, 2022   (IN) ............................ 2021 41040399

(51) Int. Cl.
*H04W 24/10*       (2009.01)
*H04W 72/23*       (2023.01)
(Continued)

(52) U.S. Cl.
CPC ........... *H04W 24/10* (2013.01); *H04W 72/23* (2023.01); *H04W 76/27* (2018.02); *H04W 72/231* (2023.01)

(58) Field of Classification Search
CPC ..... H04W 24/00; H04W 24/10; H04W 72/00; H04W 72/04; H04W 72/042;
(Continued)

(56) References Cited

U.S. PATENT DOCUMENTS 12,149,967 B2 *  11/2024  Cui ....................... H04W 24/08
2010/0113055 A1 *  5/2010  Iwamura ............... H04W 24/10
                                                             455/561
(Continued)

FOREIGN PATENT DOCUMENTS

CN       101682577 B       7/2016
CN       115567172     *   1/2023   ........... H04L 5/0053
(Continued)

OTHER PUBLICATIONS

'3GPP; TSG RAN; NR; Radio Resource Control (RRC) protocol specification (Release 16)', 3GPP TS 38.331 V16.5.0 (Jun. 2021), Jul. 6, 2021.
(Continued)

*Primary Examiner* — Warner Wong
(74) *Attorney, Agent, or Firm* — Jefferson IP Law, LLP

(57)                ABSTRACT

The disclosure relates to a 5$^{th}$ generation (5G) or 6$^{th}$ generation (6G) communication system for supporting a higher data transmission rate. A method for supporting multiple measurement gaps in a wireless network by a radio access network node (RAN node) is provided. The method includes creating a radio resource control (RRC) message comprising one of a RRC Reconfiguration or a RRC Resume with additional Information Elements (IEs) for configuration of the multiple measurement gaps, transmitting the RRC message with the additional IEs in the gap configuration of each of the measurement gap to a user equipment (UE) in the wireless network for configuration of the multiple measurement gaps. Further, the method includes receiving an RRC message comprising of one of an RRC Reconfiguration Complete or an RRC Resume Complete indicating successful application of the received measurement gap configuration from the UE.

20 Claims, 21 Drawing Sheets

(51) Int. Cl.
| | |
|---|---|
| *H04W 76/27* | (2018.01) |
| *H04W 72/231* | (2023.01) |

(58) Field of Classification Search
CPC ..... H04W 76/00; H04W 76/20; H04W 76/27; H04W 72/231; H04L 41/08; H04L 41/0803

See application file for complete search history.

(56) References Cited

U.S. PATENT DOCUMENTS

| | | | |
|---|---|---|---|
| 2017/0005764 A1* | 1/2017 | Park | H04W 8/005 |
| 2017/0171768 A1* | 6/2017 | Kim | H04L 5/001 |
| 2017/0230815 A1* | 8/2017 | Yasukawa | H04W 72/02 |
| 2019/0021017 A1* | 1/2019 | Nagaraja | H04L 5/0048 |
| 2019/0150015 A1* | 5/2019 | Wei | H04L 27/2666 |
| | | | 370/328 |
| 2019/0173634 A1* | 6/2019 | Teyeb | H04W 24/10 |
| 2019/0253909 A1* | 8/2019 | Yiu | H04W 72/0453 |
| 2019/0342801 A1* | 11/2019 | Cui | H04W 72/23 |
| 2020/0084677 A1* | 3/2020 | Yiu | H04W 8/24 |
| 2020/0137605 A1 | 4/2020 | Liu et al. | |
| 2021/0211953 A1* | 7/2021 | Tsai | H04W 36/0094 |
| 2022/0014955 A1* | 1/2022 | Yang | H04W 76/27 |
| 2022/0046454 A1* | 2/2022 | Yiu | H04W 8/24 |
| 2022/0060923 A1* | 2/2022 | Zheng | H04W 24/10 |
| 2022/0322308 A1* | 10/2022 | He | H04L 41/0896 |
| 2022/0369143 A1* | 11/2022 | Yang | H04W 24/08 |
| 2023/0180037 A1* | 6/2023 | Dalsgaard | H04W 24/10 |
| | | | 370/252 |
| 2023/0328572 A1* | 10/2023 | Kanneath Abraham | |
| | | | H04W 24/10 |
| | | | 370/252 |
| 2023/0345569 A1* | 10/2023 | Kim | H04W 76/19 |
| 2023/0362699 A1* | 11/2023 | Yerramalli | H04W 24/10 |
| 2023/0362920 A1* | 11/2023 | Niu | H04L 1/1812 |
| 2023/0396984 A1* | 12/2023 | Shrivastava | H04W 76/27 |
| 2024/0073724 A1* | 2/2024 | Chen | H04W 24/10 |
| 2024/0080694 A1* | 3/2024 | Yang | H04W 36/0088 |
| 2024/0129904 A1* | 4/2024 | Cabrera Mercader | |
| | | | H04W 72/0446 |
| 2024/0172021 A1* | 5/2024 | Hong | H04W 8/22 |
| 2024/0244533 A1* | 7/2024 | Niu | H04B 17/328 |
| 2024/0276277 A1* | 8/2024 | Yamamoto | H04B 7/0626 |
| 2024/0357400 A1* | 10/2024 | Manolakos | H04L 5/0048 |

FOREIGN PATENT DOCUMENTS

| | | | | |
|---|---|---|---|---|
| CN | 113498092 | * | 6/2023 | ........... H04W 24/04 |
| CN | 118764954 | * | 10/2024 | ........... H04W 64/00 |
| WO | 2020/060951 A1 | | 3/2020 | |
| WO | WO-2023039785 A1 | * | 3/2023 | ........... H04W 24/02 |
| WO | WO-2023068356 A1 | * | 4/2023 | ........... H04B 7/0626 |
| WO | WO-2023080094 A1 | * | 5/2023 | ........... H04W 24/10 |
| WO | WO-2023123118 A1 | * | 7/2023 | ............... H04L 5/00 |
| WO | WO-2023127638 A1 | * | 7/2023 | ........... H04W 24/10 |
| WO | WO-2023127639 A1 | * | 7/2023 | ........... H04W 24/10 |
| WO | WO-2024022655 A1 | * | 2/2024 | ....... H04W 36/0069 |
| WO | WO-2024026862 A1 | * | 2/2024 | ........... H04W 24/10 |
| WO | WO-2024037401 A1 | * | 2/2024 | ........... H04W 24/08 |

OTHER PUBLICATIONS

Nokia et al., 'Discussion on concurrent measurement gaps', R4-2114023, 3GPP TSG RAN WG4 Meeting #100-e, Aug. 6, 2021.

Intel Corporation, 'Discussion on concurrent measurement gaps in NR', R4-2113151, 3GPP TSG RAN WG4 Meeting #100-e, Aug. 6, 2021.

International Search Report and Written Opinion dated Dec. 8, 2022, issued in International Application No. PCT/KR2022/013280.

Nokia et al., Discussion on Network Controlled Small Gaps for NR, R4-2114064, 3GPP TSG-RAN WG4 Meeting #100-e, Aug. 6, 2021.

Mediatek Inc., Multiple concurrent and independent gap patterns, R4-2104583, 3GPP TSG-RAN WG4 Meeting #98-bis-e, Apr. 5, 2021.

European Search Report dated Nov. 25, 2024, issued in European Application No. 22865118.8.

3rd Generation Partnership Project; Technical Specification Group Radio Access Network; NR; NR and NG-RAN Overall Description; Stage 2 (Release 17), 3GPP TS 38.300 V17.1.0, Jun. 2022.

3rd Generation Partnership Project; Technical Specification Group Radio Access Network; NR; Requirements for support of radio resource management (Release 16), 3GPP TS 38.133 V16.5.0, Sep. 2020.

3rd Generation Partnership Project; Technical Specification Group Radio Access Network; NR; Physical layer measurements (Release 17), 3GPP TS 38.215 V17.1.0, Mar. 2022.

3rd Generation Partnership Project; Technical Specification Group Radio Access Network; NR; Medium Access Control (MAC) protocol specification (Release 17), 3GPP TS 38.321 V17.1.0, Jun. 2022.

* cited by examiner

1000

S400

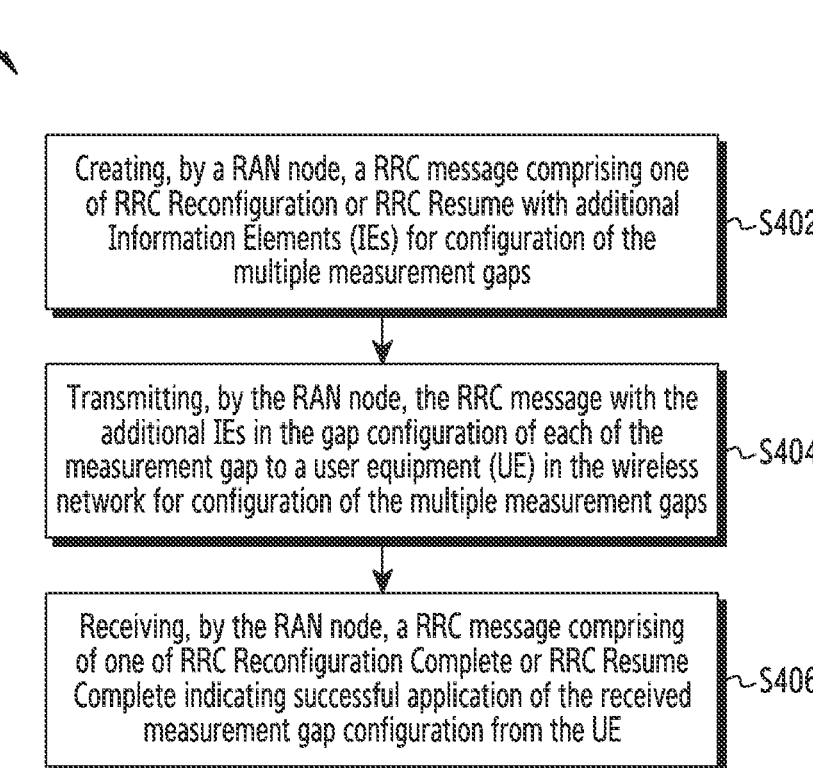

Creating, by a RAN node, a RRC message comprising one of RRC Reconfiguration or RRC Resume with additional Information Elements (IEs) for configuration of the multiple measurement gaps ~S402

Transmitting, by the RAN node, the RRC message with the additional IEs in the gap configuration of each of the measurement gap to a user equipment (UE) in the wireless network for configuration of the multiple measurement gaps ~S404

Receiving, by the RAN node, a RRC message comprising of one of RRC Reconfiguration Complete or RRC Resume Complete indicating successful application of the received measurement gap configuration from the UE ~S406

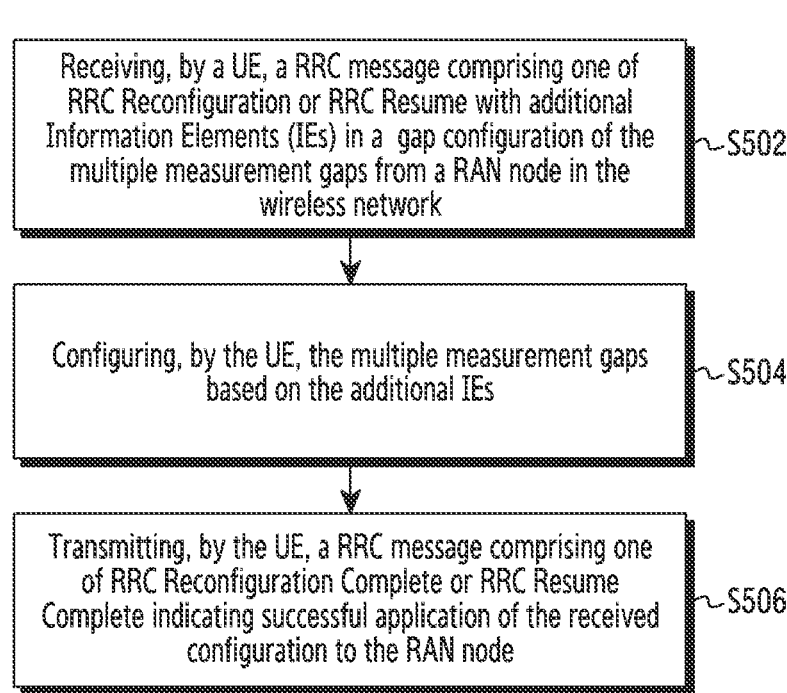

Receiving, by a UE, a RRC message comprising one of RRC Reconfiguration or RRC Resume with additional Information Elements (IEs) in a gap configuration of the multiple measurement gaps from a RAN node in the wireless network    ~S502

Configuring, by the UE, the multiple measurement gaps based on the additional IEs    ~S504

Transmitting, by the UE, a RRC message comprising one of RRC Reconfiguration Complete or RRC Resume Complete indicating successful application of the received configuration to the RAN node    ~S506

Receive the configuration from RAN node to report network controlled small gap requirement ~S1302

Transmit to the network in NeedForGaps that a frequency band can be measured using network controlled small gaps in RRC Reconfigurtation complete and RRC Resume complete ~S1304

S1600

S1700

S1800

Determine that SCG is activated    ~S1802

Activate the preconfigured gap    ~S1804

METHOD AND WIRELESS NETWORK FOR SUPPORTING MULTIPLE MEASUREMENT GAPS IN WIRELESS NETWORK

CROSS-REFERENCE TO RELATED APPLICATION(S)

This application is based on and claims priority under 35 U.S.C. § 119(a) of an Indian Provisional patent application number 202141040399, filed on Sep. 6, 2021, in the Indian Patent Office, and of an Indian Complete patent application number 202141040399, filed on Aug. 22, 2022, in the Indian Patent Office, the disclosure of each of which is incorporated by reference herein in its entirety.

BACKGROUND

1. Field

The disclosure relates to a wireless communication. More particularly, the disclosure relates to a method and a wireless network for configuration of one or more measurement gaps in the wireless network (e.g., $5^{th}$ Generation (5G) wireless communication network (NW)).

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as millimeter wave (mmWave) including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a wireless network for configuration of one or more measurement gaps in the wireless network.

Additional aspects will be set forth in part in the description which follows and, in part, will be apparent from the description, or may be learned by practice of the presented embodiments.

In accordance with an aspect of the disclosure, a method for supporting multiple measurement gaps in a wireless network is provided. The method includes creating, by a radio access network node (RAN node) in the wireless network, a radio resource control (RRC) message comprising one of a RRC Reconfiguration or a RRC Resume with additional Information Elements (IEs) for configuration of the multiple measurement gaps, wherein the additional IEs for each measurement gap includes at least one of an identifier of each measurement gap, a mapping of the measurement gaps with a list of measurement objects, reference signals in a measurement object, where the measurement gaps are applicable, whether a Positioning Reference Signal (PRS) is to be measured during the measurement gaps, an activation status of the measurement gaps, a presence of a type of the measurement gaps indicating whether the measurement gap is a preconfigured measurement gap, an absence of a type of the measurement gap indicating the measurement gap is always active and an indication whether the measurement gap is a network controlled small gap, transmitting, by the RAN node, the RRC message with the additional IEs in the gap configuration of each of the measurement gap to a user equipment (UE) in the wireless network for configuration of the multiple measurement gaps, and receiving, by the RAN node, a RRC message comprising of one of a RRC Reconfiguration Complete or a RRC Resume Complete indicating successful application of the received measurement gap configuration from the UE.

In an embodiment, the method includes transmitting, by the RAN node, a measurement gap activation or deactivation indication to the UE for activation or deactivation of at least one preconfigured measurement gap from the multiple measurement gaps through one of a Medium Access Control-Control Element (MAC CE) and a Downlink Control Information (DCI) in a Physical Downlink Control Channel (PDCCH). Further, the method includes activating or deactivating, by the RAN node, the at least one of preconfigured measurement gap from the multiple measurement gaps for the UE based on one of the transmitted MAC CE and the transmitted DCI.

In an embodiment, the DCI is of a variable length. The length of the DCI in bits is equal to a number of preconfigured measurement gaps configured by the RRC message comprising one of RRC Reconfiguration or RRC Resume. Each of the bits in the DCI indicates at least one of the activation status of the measurement gaps, and toggling the current activation status of the measurement gaps with corresponding index identifier of the preconfigured measurement gap.

In an embodiment, the MAC CE comprises at least one of an activation status of the measurement gaps, wherein the activation status is represented by a predefined value for activation and another predefined value for deactivation or by toggling a bit at the corresponding index identifier of the preconfigured measurement gap, and wherein the predefined value is set at corresponding index identifier of the preconfigured measurement gap.

In an embodiment, the method includes transmitting, by the RAN node, an RRC message comprising one of RRC Reconfiguration or RRC Resume for gap configuration to the UE. The RRC message for gap configuration comprises a measurement gap release list to release one or more measurement gaps from the multiple measurement gaps. Further, the method includes receiving, by the RAN node, a message comprising of one of RRC Reconfiguration Complete or RRC Resume Complete indicating the one or more measurement gaps are released successfully from the UE. Further, the method includes releasing, by the RAN node, the one or more measurement gaps from the multiple measurement gaps based on the measurement gap release list.

In an embodiment, the method includes sending, by the RAN node, an RRC message comprising one of RRC Reconfiguration or RRC Resume to the UE informing whether the UE performs autonomous measurement gap release or autonomous activation or deactivation of the measurement gap. Further, the method includes receiving, by the RAN node, an RRC message comprising one of RRC Reconfiguration complete or RRC Resume complete indicating the RRC message is received successfully from the UE.

In an embodiment, the method includes sending, by the RAN node, a configuration to the UE to report a network controlled small gap requirement. Further, the method includes receiving, by the RAN node, one of an RRC Reconfiguration complete message or an RRC Resume complete message comprising a NeedForGaps information from the UE indicating that a frequency band is measured using the network controlled small gaps.

In an embodiment, the method includes sending, by the RAN node, an RRC message comprising UE capability enquiry information to the UE. Further, the method includes receiving, by the RAN node, an RRC UE capability information from the UE. The UE capability information includes a support of the multiple measurement gaps, a number of the measurement gaps supported, and a support of preconfigured gaps of the multiple measurement gaps.

In accordance with another aspect of the disclosure, a method for supporting multiple measurement gaps in a wireless network is provided. The method includes receiving, by a UE in the wireless network, a RRC message comprising one of RRC Reconfiguration or RRC Resume with additional IEs in a gap configuration of the multiple measurement gaps from a RAN node in the wireless network, wherein the additional IEs for each measurement gap comprises at least one of an identifier of each measurement gap, a mapping of the measurement gaps with a list of measurement objects, reference signals in a measurement object where the measurement gaps are applicable, whether a PRS is to be measured during the measurement gaps, an activation status of the measurement gaps, a presence of a type of the measurement gaps indicating whether the measurement gap is a preconfigured measurement gap, an absence of a type of the measurement gap indicating the measurement gaps is always active and an indication whether the measurement gap is a network controlled small gap, configuring, by the UE, the multiple measurement gaps based on the additional IEs, and transmitting, by the UE, a RRC message comprising one of RRC Reconfiguration Complete or RRC Resume Complete indicating successful application of the received configuration to the RAN node.

In an embodiment, the method includes receiving, by the UE, a measurement gap activation or deactivation indication from the RAN node for activation or deactivation of at least one preconfigured measurement gap from the multiple measurement gaps through one of a MAC CE and a DCI in a PDCCH. Further, the method includes activating or deactivating, by the UE, the at least one preconfigured measurement gap from the multiple measurement gaps based on one of the received MAC CE and the received DCI in the PDCCH.

In an embodiment, the method includes receiving, by the UE, an RRC message for gap configuration from the RAN node, where the RRC message comprising one of RRC Reconfiguration or RRC Resume for gap configuration comprises a measurement gap release list to release one or more measurement gaps from the multiple measurement gaps. Further, the method includes releasing, by the UE, one or more measurement gaps from the multiple measurement gaps based on the measurement gap release list. Further, the method includes transmitting, by the UE, an RRC message comprising one of RRC Reconfiguration Complete or RRC Resume Complete indicating the one or more measurement gaps are released successfully.

In an embodiment, the method includes determining, by the UE, at least one of switching of the reference signal in the measurement object (MO) to the type that does not need the measurement gap, release of measurement object by a RRC message or autonomously with MO is only associated to a report configuration with report-type set to condition trigger configuration, release of the PRS. Further, the method includes determining, by the UE, that any other MO or the PRS need the measurement gap. Further, the method includes determining, by the UE, whether the measurement gap is a preconfigured measurement gap. Further, the method includes performing, by the UE, one of releasing the measurement gap in response to determining that the measurement gap is not needed for any other MO or the PRS and the measurement gap is not a preconfigured measurement gap and transmitting a Location Measurement Indication to indicate releasing of the measurement gap when the measurement gap is used for the PRS measurement, and deactivating the measurement gap in response to determining that the measurement gap is not needed for any other MO or the PRS and the measurement gap is a preconfigured gap and transmitting a Location Measurement Indication to indicate deactivation of the measurement gap when the measurement gap is used for the PRS measurement.

In an embodiment, the method includes selecting, by the UE, the next Physical Random Access Channel (PRACH) occasion (PO). Further, the method includes determining, by the UE, that the selected PO overlaps at least one of a preconfigured measurement gap of the multiple measurement gaps. Further, the method includes determining, by the UE, whether the overlapping at least one preconfigured measurement gap is activated. Further, the method includes transmitting, by the UE, a PRACH preamble in the selected PRACH occasion in response to determining that the PO is not overlapping with any of the preconfigured measurement gap or none of the overlapping at least one preconfigured measurement gap is activated. Further, the method includes selecting by the UE, next PRACH occasion in response to determining that the PO is overlapping with at least one of preconfigured measurement gap and at least one of the overlapping preconfigured measurement gap is activated.

In an embodiment, the method includes receiving, by the UE, an RRC message comprising one of RRC Reconfiguration or RRC Resume from the RAN node informing whether the UE performs an autonomous measurement gap release or an autonomous activation or deactivation of the measurement gap. Further, the method includes sending, by the UE, an RRC message comprising one of RRC Reconfiguration complete or RRC Resume complete indicating that the RRC message is received successfully at the RAN node. Further, the method includes autonomously releasing or activating or deactivating, by the UE, the measurement gap based on the received RRC message.

In an embodiment, the method includes receiving, by the UE, a configuration from the RAN node to report a network controlled small gap requirement. Further, the method includes sending, by the UE, one of an RRC Reconfiguration complete message or an RRC Resume complete message comprising a NeedForGaps information to the RAN node indicating that a frequency band is measured using the network controlled small gaps.

In an embodiment, the method includes receiving, by the UE, an RRC message comprising UE capability enquiry from the RAN node. Further, the method includes sending, by the UE, an RRC UE capability information message to the RAN node, where the UE capability information message comprises at least one of a support of the multiple measurement gaps, a number of the measurement gaps supported, and a support of preconfigured gaps of the multiple measurement gaps.

In an embodiment, the method includes determining, by the UE, whether a preconfigured measurement gap of the multiple measurement gaps overlaps the transmission opportunity for transmitting a scheduling request or a transport block to the RAN node. Further, the method includes determining, by the UE, whether the overlapping preconfigured measurement gap is activated in response to determining that the preconfigured measurement gap overlaps with the transmission opportunity. Further, the method includes transmitting, by the UE, the scheduling request or the transport block in response to determining that the preconfigured measurement gap is not overlapping with the transmission opportunity or the overlapping preconfigured measurement gap is not activated. Further, the method includes waiting for a next transmission opportunity for transmitting the scheduling request or the transport block in response to determining that the preconfigured measurement gap overlaps with the transmission opportunity and the overlapping preconfigured measurement gap is activated.

In an embodiment, the method includes detecting, by the UE, an activation or deactivation of a configured secondary cell group (SCG) or secondary cell (SCell). Further, the method includes activating or deactivating, by the UE, at least one of the preconfigured measurement gaps of the multiple measurement gaps based on detection.

In accordance with another aspect of the disclosure, a RAN node for supporting multiple measurement gaps in a wireless network is provided. The RAN node includes a transceiver and a processor. The processor is configured to create a radio resource control (RRC) message comprising one of a RRC Reconfiguration or a RRC Resume with additional Information Elements (IEs) for configuration of the multiple measurement gaps. The additional IEs for each measurement gap comprises at least one of an identifier of each measurement gap, a mapping of the measurement gaps with a list of measurement objects, reference signals in a measurement object, where the measurement gaps are applicable, whether a Positioning Reference Signal (PRS) is to be measured during the measurement gaps, an activation status of the measurement gaps, a presence of a type of the measurement gaps indicating whether the measurement gap is a preconfigured measurement gap, an absence of a type of the measurement gap indicating the measurement gap is always active and an indication whether the measurement gap is a network controlled small gap, transmit the RRC message with the additional IEs in the gap configuration of each of the measurement gap to a UE in the wireless network for configuration of the multiple measurement gaps, and receive a RRC message comprising of one of a RRC Reconfiguration Complete or a RRC Resume Complete indicating successful application of the received measurement gap configuration from the UE.

In accordance with another aspect of the disclosure, a UE for supporting multiple measurement gaps in a wireless network is provided. The UE includes a transceiver and a processor. The processor is configured to receive a RRC message comprising one of RRC Reconfiguration or RRC Resume with additional Information Elements (IEs) in a gap configuration of the multiple measurement gaps from a RAN node in the wireless network, wherein the additional IEs for each measurement gap comprises at least one of an identifier of each measurement gap, a mapping of the measurement gaps with a list of measurement objects, reference signals in a measurement object where the measurement gaps are applicable, whether a PRS is to be measured during the measurement gaps, an activation status of the measurement gaps, a presence of a type of the measurement gaps indicating whether the measurement gap is a preconfigured measurement gap, an absence of a type of the measurement gap indicating the measurement gaps is always active and an indication whether the measurement gap is a network controlled small gap, configure the multiple measurement gaps based on the additional IEs, and transmit a RRC message comprising one of RRC Reconfiguration Complete or RRC Resume Complete indicating successful application of the received configuration to the RAN node.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flow chart illustrating a method, implemented by the RAN node, for supporting multiple measurement gaps in the wireless network, according to an embodiment of the disclosure;

FIG. 5 is a flow chart illustrating a method, implemented by the UE node, for supporting multiple measurement gaps in the wireless network, according to an embodiment of the disclosure;

8

Figure 9:
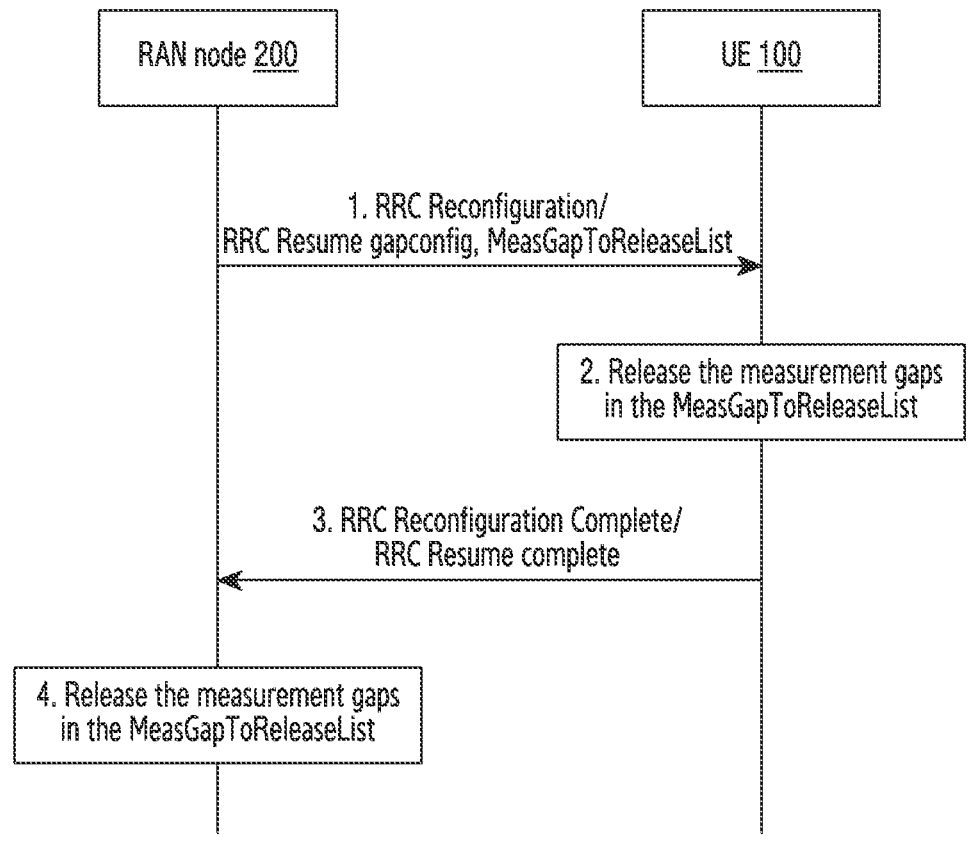
Figure 10:
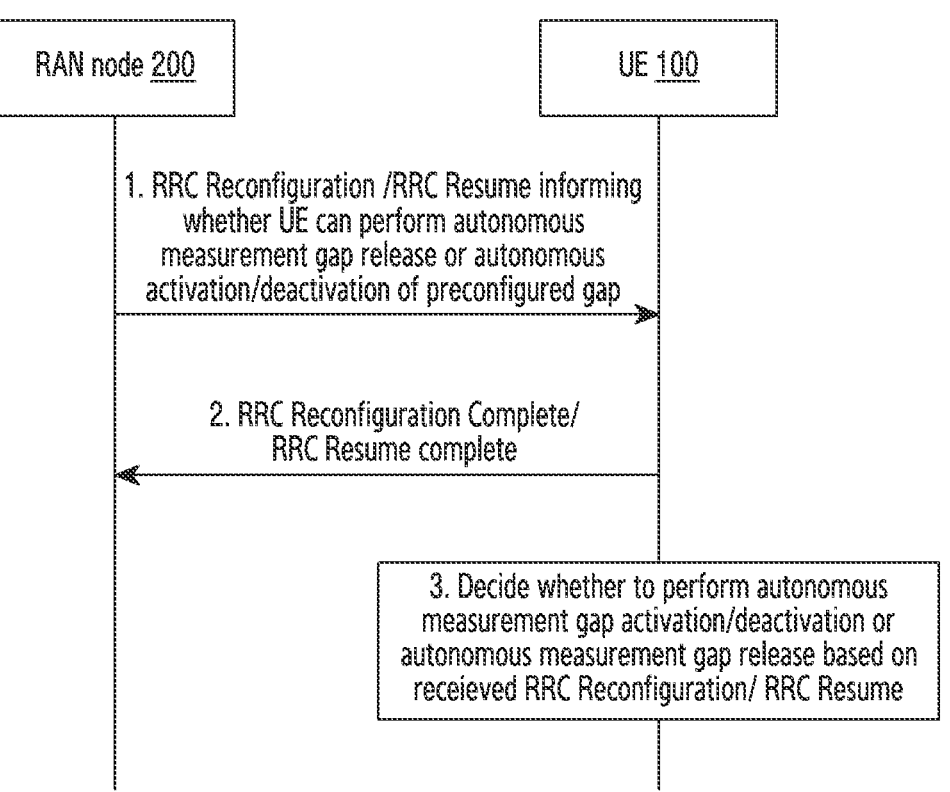
Figure 11:
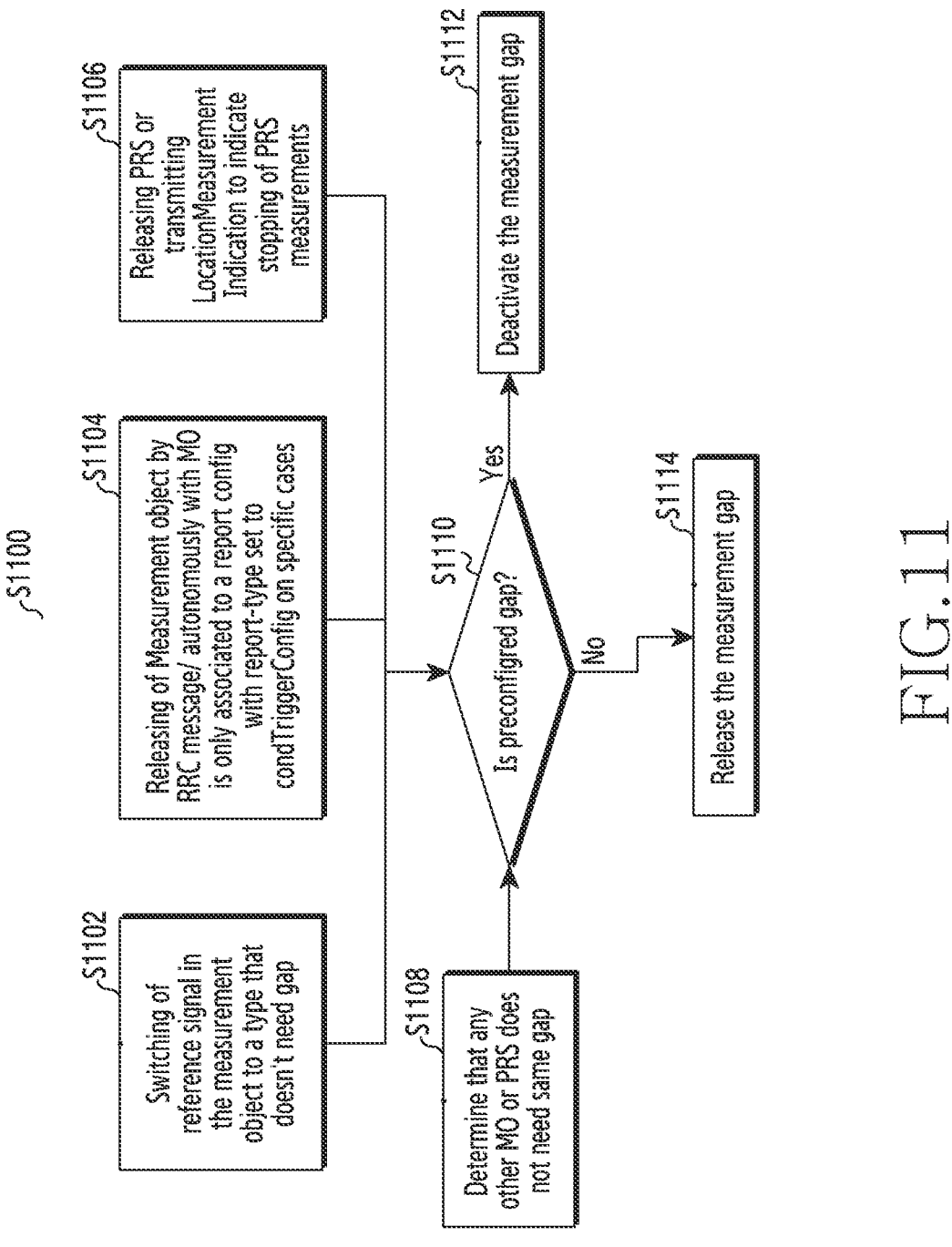
Figure 12:
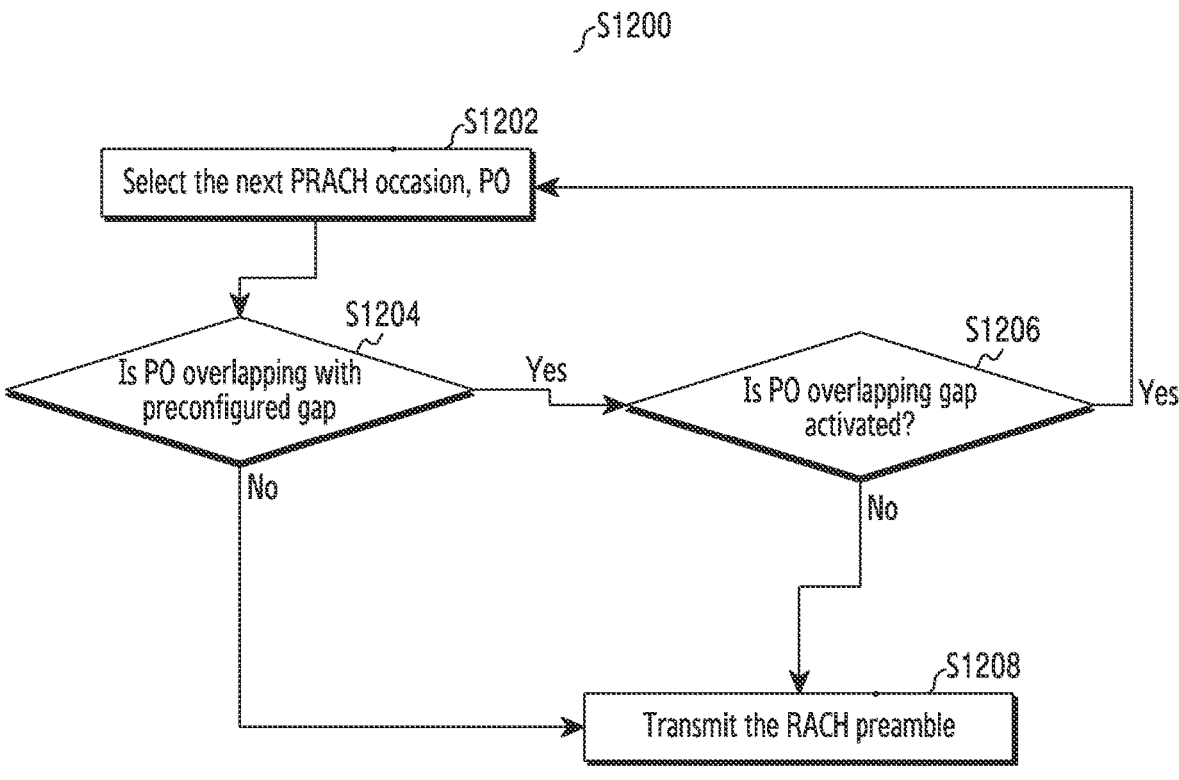
Figure 13:
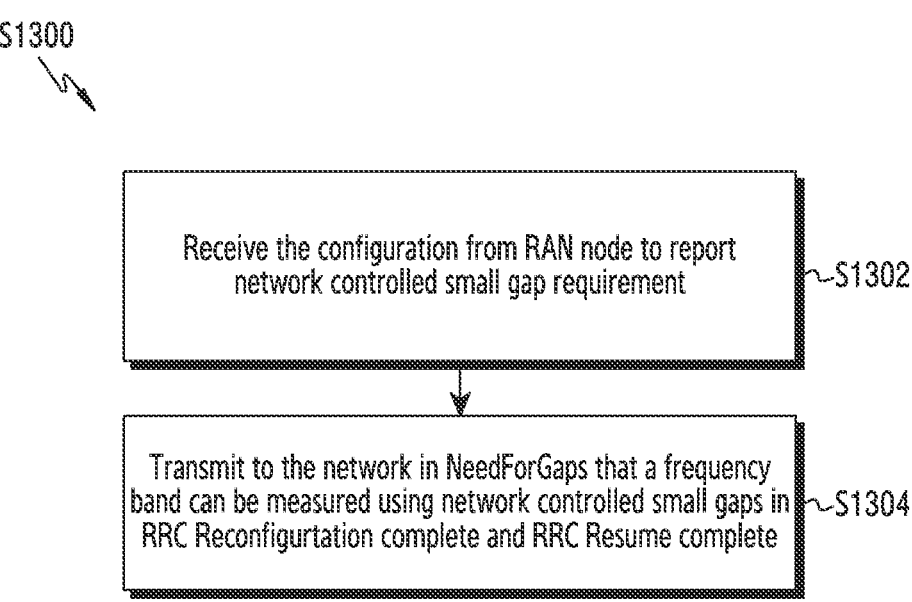
Figure 14:
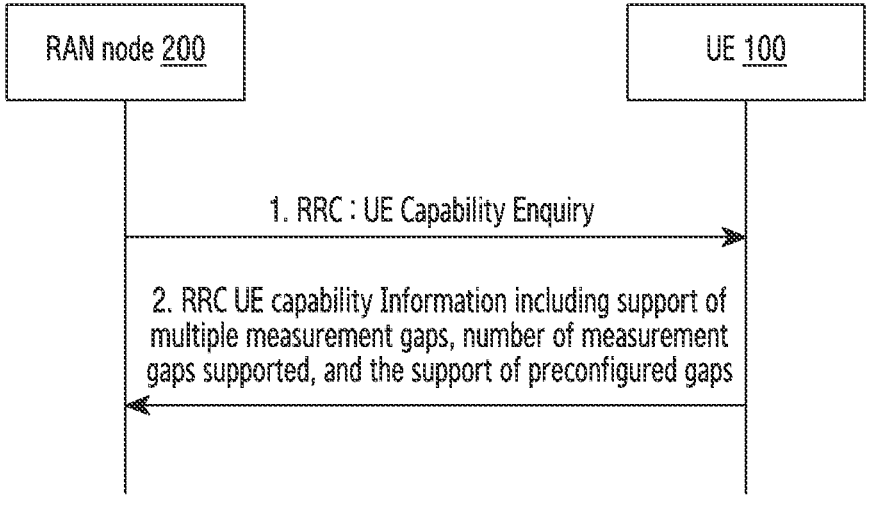
Figure 15:
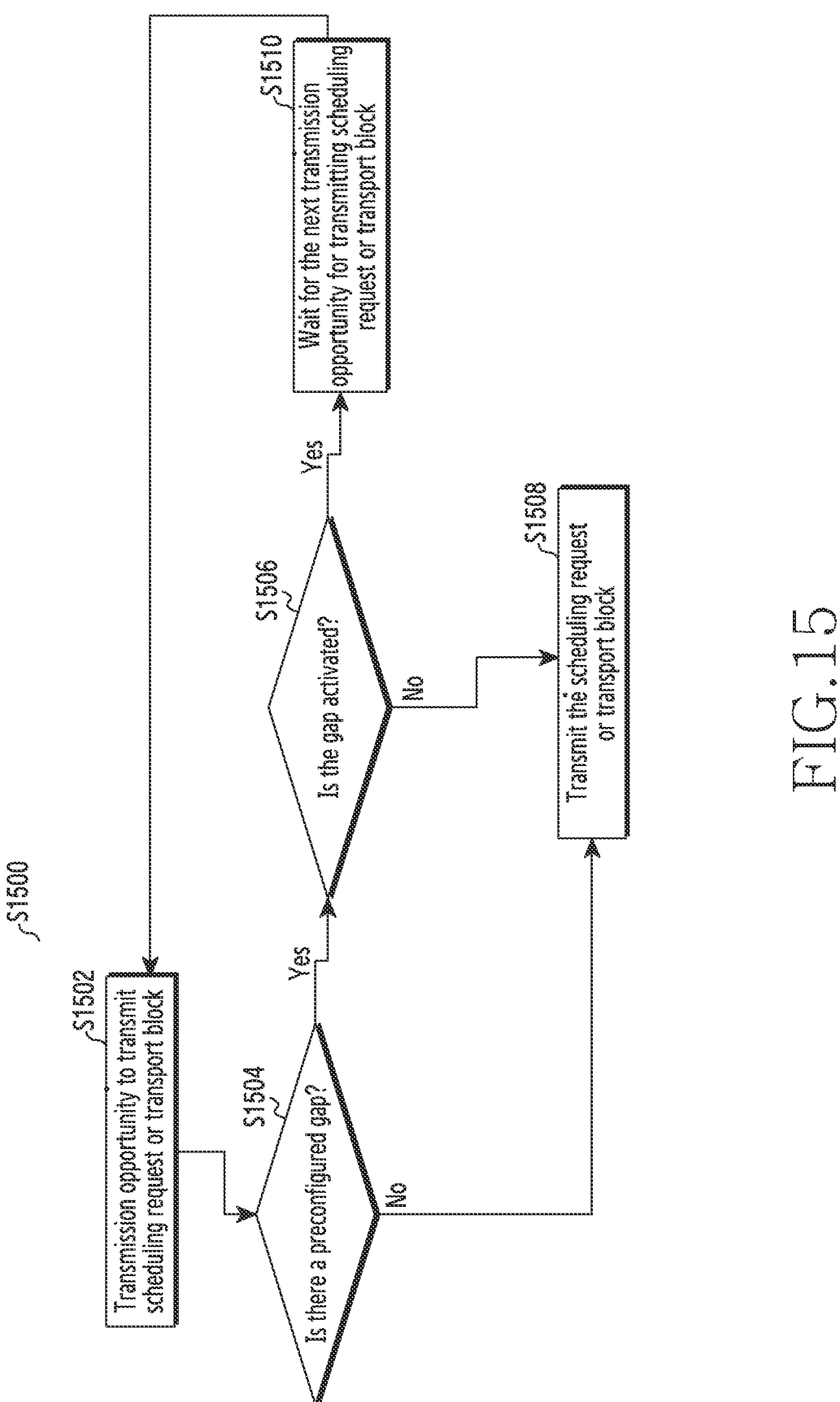
Figure 16:
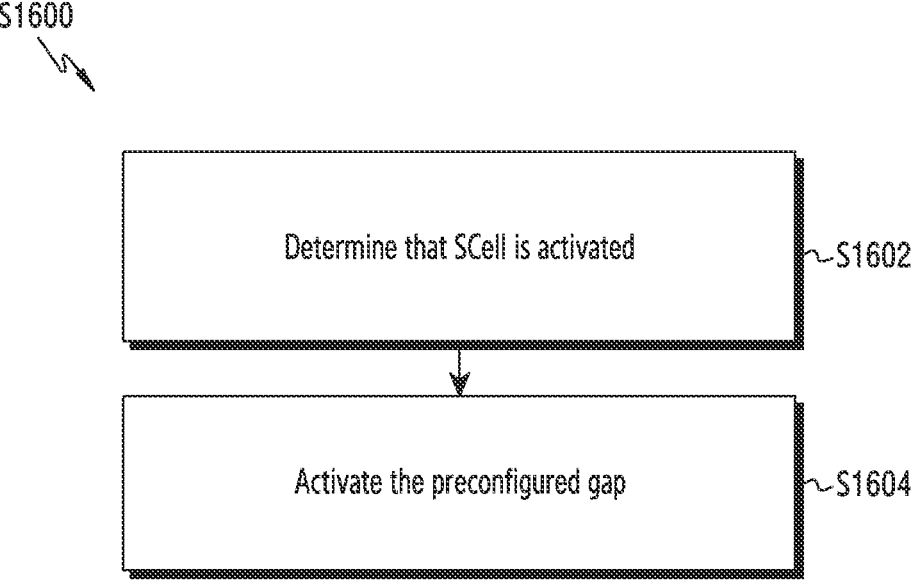
Figure 17:
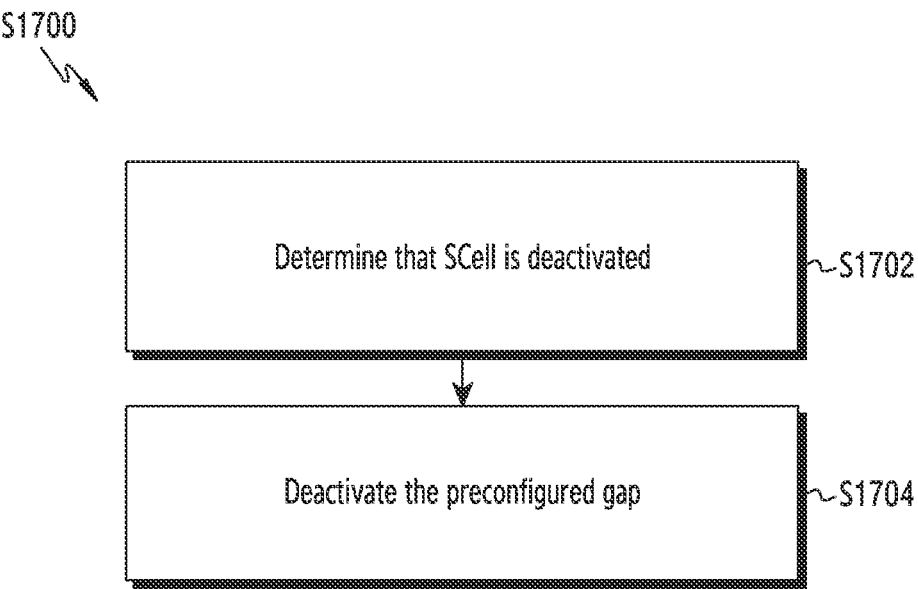
Figure 18:
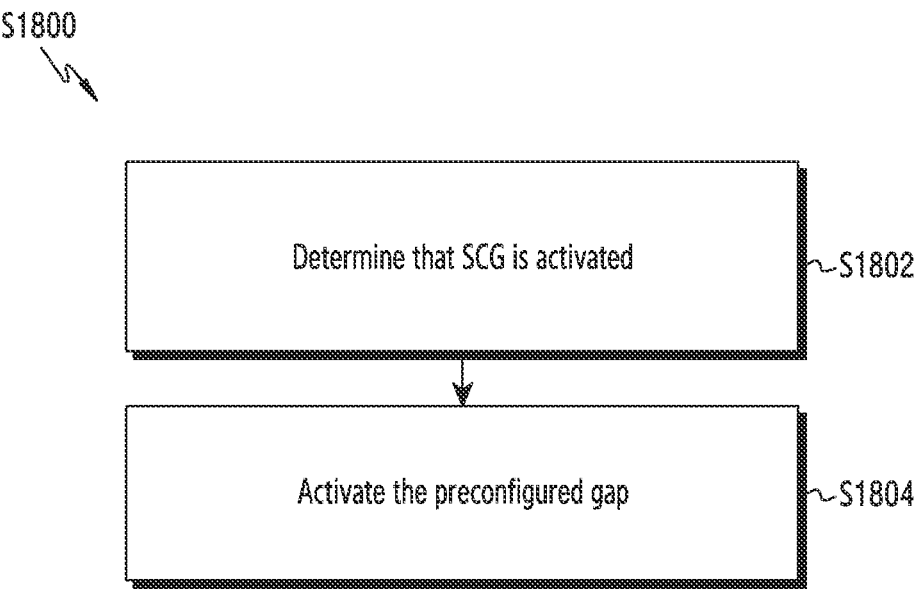
Figure 19:
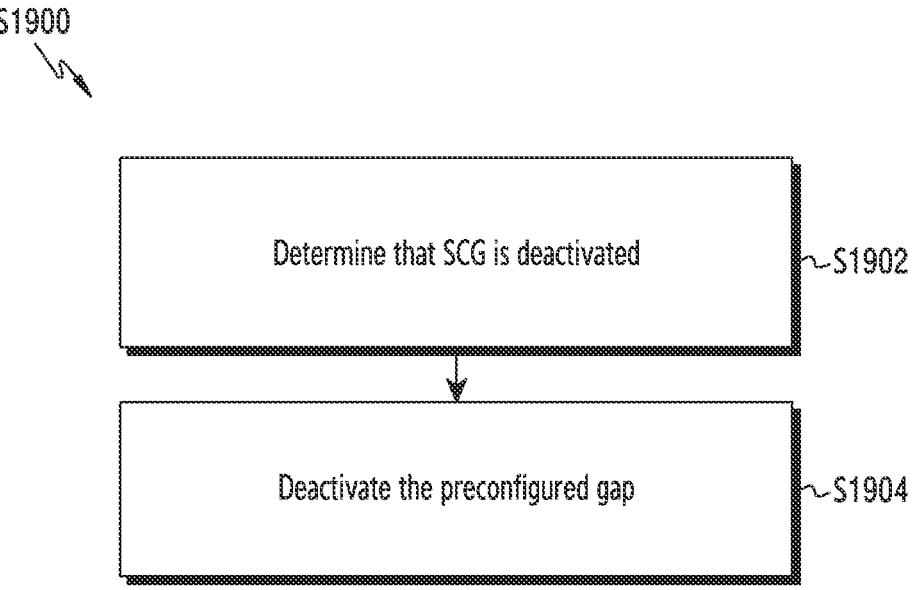
Figure 20:
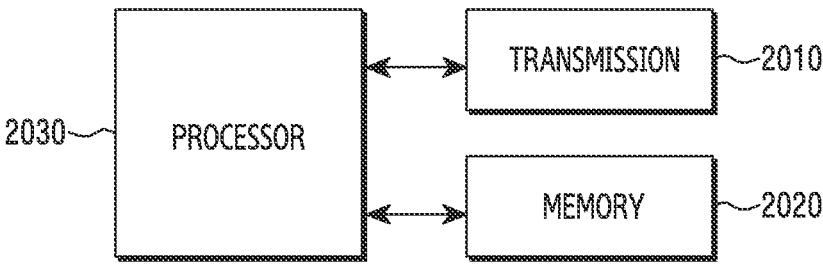
Figure 21:
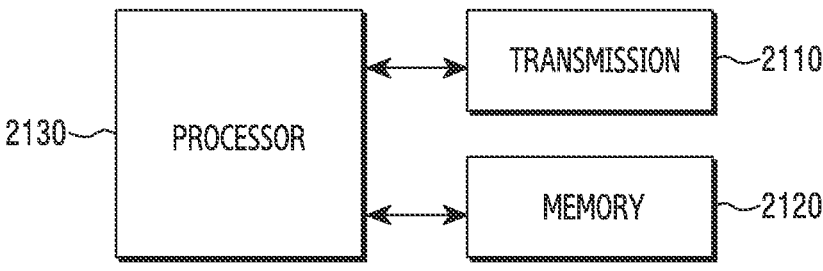

FIG. 9 illustrates an example scenario of release of multiple measurement gaps by network, according to an embodiment of the disclosure;

FIG. 10 illustrates an example scenario of configuration for autonomous activation/deactivation and autonomous release, according to an embodiment of the disclosure;

FIG. 11 illustrates an example scenario of autonomous release of measurement gaps, according to an embodiment of the disclosure;

FIG. 12 illustrates an example scenario of RACH preamble transmission with preconfigured gaps, according to an embodiment of the disclosure;

FIG. 13 illustrates an example scenario of the UE informing the RAN node about a need for a network controlled small gap (NCSG), according to an embodiment of the disclosure;

FIG. 14 illustrates an example scenario of capability exchange for multiple gaps and preconfigured gap, according to an embodiment of the disclosure;

FIG. 15 illustrates an example scenario of scheduling request and transport block transmission with preconfigured gaps, according to an embodiment of the disclosure;

FIG. 16 illustrates an example scenario of preconfigured gap activation with Scell, according to an embodiment of the disclosure;

FIG. 17 illustrates an example scenario of preconfigured gap deactivation with the Scell, according to an embodiment of the disclosure;

FIG. 18 illustrates an example scenario of preconfigured gap activation with a SCG, according to an embodiment of the disclosure;

FIG. 19 illustrates an example scenario of preconfigured gap deactivation with the SCG, according to an embodiment of the disclosure;

FIG. 20 is a block diagram illustrating a structure of a UE according to an embodiment of the disclosure; and FIG. 21 is a block diagram illustrating a structure of a base station according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the description below, it may be advantageous to set forth definitions of certain words and phrases used throughout this patent document.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication.

The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In wireless communication technologies like New Radio (NR) and Long Term Evolution (LTE), a Radio Resource Control (RRC) Connected (RRC_CONNECTED) User Equipment (UE) performs various measurements for Radio Resource management (RRM) purpose, positioning etc. For the RRM, the UE measures reference signals such as Synchronization Signal block (SSB), Chanel State Information-Reference Signal (CSI-RS) etc. and reports to the wireless network.

According to the latest version of $3^{rd}$ generation partnership project (3GPP) 5G New Radio (NR) stage-2 specification TS 38.300, measurements which are to be performed by the UE for Connected mode mobility, are classified in to at least four measurement types:

Intra-frequency NR measurements,

Inter-frequency NR measurements,

Inter-Radio Access Technology (RAT) measurements for Evolved Universal Terrestrial Radio Access (E-UTRA), and Inter-RAT measurements for a Universal Terrestrial Radio Access (UTRA).

For each measurement type, one or several measurement objects can be defined (a measurement object defines e.g. a carrier frequency to be monitored). For each measurement object, one or several reporting configurations can be defined (a reporting configuration e.g. defines the reporting criteria). Three reporting criteria are used: event triggered reporting, periodic reporting and event triggered periodic reporting. The association between a measurement object and a reporting configuration is created by a measurement identity (a measurement identity links together one measurement object and one reporting configuration of the same Radio Access Technology (RAT)). The measurements identity is used as well when reporting results of the measurements.

For positioning, the UE may report SSB/CSI-RS measurements and may also report measurements based on additional reference signals like Positioning Reference Signal (PRS).

When the UE needs to measure inter frequency NR or inter-RAT measurements or intra-frequency measurements outside the active downlink (DL) Band Width Part (BWP) when the SSB is not completely contained in the active DL BWP, the UE may use measurement gaps. The measurement gaps are configured by the network entity (for e.g. base station or gNB in NR or the like) and there will not be any transmission or reception between the network and the UE during the gap period. The measurement gap configuration includes a gap offset, gap length, repetition period and measurement gap timing advance (mgta). The gap offset specifies the sub-frame (and/or slot) where the measurement gap occurs. The gap length gives the duration of the gap while the repetition period defines how often the measurement gap can occur.

$3^{rd}$ Generation Partnership Project (3GPP) has defined a number of measurement gap patterns. Each gap pattern corresponds to a gap length and a gap repetition period. For e.g. in NR Release 16, there are 26 gap patterns defined. Measurement gap timing advance specifies a timing advance value in milliseconds. Gap occurs "mgta" milliseconds before the sub-frame given by the measurement gap offset.

In the Release 16 NR specifications, the UE may be configured with maximum one measurement gap at any time. The measurement gaps are activated immediately after the configuration, from the measurement gap-offset that comes after the reconfiguration. This leads to restrictions for UE and network implementation.

An extract of relevant specification (TS 38.133 v16.5) on measurement gaps is given below.

If the UE requires measurement gaps to identify and measure intra-frequency cells and/or inter-frequency cells and/or inter-RAT evolved-universal terrestrial radio access network (E-UTRAN) cells, and the UE does not support independent measurement gap patterns for different frequency ranges, in order for the requirements in the following clauses to apply the network must provide a single per-UE measurement gap pattern for concurrent monitoring of all frequency layers.

If the UE requires measurement gaps to identify and measure intra-frequency cells and/or inter-frequency cells and/or inter-RAT E-UTRAN cells, and the UE supports independent measurement gap patterns for different frequency ranges, in order for the requirements in the following clauses to apply the network must provide either per-Frequency Range (FR) measurement gap patterns for frequency range where the UE requires per-FR measurement gap for concurrent monitoring of all frequency layers of each frequency range independently, or a single per-UE measurement gap pattern for concurrent monitoring of all frequency layers of all frequency ranges. If the UE is configured via LTE Positioning Protocol (LPP) to measure PRS for any Reference Signal Time Difference (RSTD), PRS-Reference signal Received Power (PRS-RSRP), and UE Rx-Tx time difference measurement defined in TS 38.215, in order for the requirements in clauses 9.9.2, 9.9.3, and 9.9.4 to apply, the network must provide a single per-UE measurement gap pattern for concurrent monitoring of all positioning frequency layers and intra frequency, inter-frequency and/or inter-RAT frequency layers of all frequency ranges, or for measurement gap patterns other than #24 and #25, if UE supports independent measurement gap patterns for different frequency ranges, per-FR measurement gap pattern for the frequency range for concurrent monitoring of all positioning frequency layers and intra-frequency, inter-frequency cells and/or inter-RAT frequency layers in the corresponding frequency range.

During the per-UE measurement gaps the UE:

is not required to conduct reception/transmission from/to the corresponding E-UTRAN primary cell (PCell), E-UTRAN SCell(s) and NR serving cells for E-UTRA-NR dual connectivity except the reception of signals used for RRM measurement(s) and the signals used for random access procedure according to TS38.321.

is not required to conduct reception/transmission from/to the corresponding NR serving cells for Stand-alone Architecture (SA) (with single carrier or Carrier Aggregation (CA) configured) except the reception of signals used for Radio Resource Management (RRM) measurement(s), PRS measurement(s) and the signals used for random access procedure.

is not required to conduct reception/transmission from/to the corresponding PCell, SCell(s) and E-UTRAN serving cells for NR-E-UTRA dual connectivity except the reception of signals used for RRM measurement(s), PRS measurement(s) and the signals used for random access procedure.

is not required to conduct reception/transmission from/to the corresponding NR serving cells for NR-Dual Connectivity (NR-DC) except the reception of signals used for RRM measurement(s), PRS measurement(s) and the signals used for random access procedure.

During the per-FR measurement gaps, the UE:

is not required to conduct reception/transmission from/to the corresponding E-UTRAN PCell, E-UTRAN SCell(s) and NR serving cells in the corresponding frequency range for E-UTRA-NR dual connectivity except the reception of signals used for RRM measurement(s) and the signals used for random access procedure according to TS38.321.

is not required to conduct reception/transmission from/to the corresponding NR serving cells in the corresponding frequency range for SA (with single carrier or CA configured) except the reception of signals used for RRM measurement(s), PRS measurement(s) and the signals used for random access procedure according to TS38.321.

is not required to conduct reception/transmission from/to the corresponding PCell, SCell(s) and E-UTRAN serving cells in the corresponding frequency range for NR-E-UTRA dual connectivity except the reception of signals used for RRM measurement(s), PRS measurement(s) and the signals used for random access procedure according to TS38.321.

is not required to conduct reception/transmission from/to the corresponding NR serving cells in the corresponding frequency range for NR-DC except the reception of signals used for RRM measurement(s), PRS measurement(s) and the signals used for random access procedure according to TS38.321.

Thus, it is desired to address the above mentioned disadvantages or other shortcomings or at least provide a useful alternative.

Accordingly, the embodiment herein is to provide a method for supporting multiple measurement gaps in a wireless network. The method includes creating, by a RAN node in the wireless network, a radio resource control (RRC) message comprising one of an RRC Reconfiguration or an RRC Resume with additional Information Elements (IEs) for configuration of the multiple measurement gaps. The additional IEs for each measurement gap includes at least one of an identifier of each measurement gap, a mapping of the measurement gaps with a list of measurement objects, reference signals in a measurement object Where the measurement gaps are applicable, whether a Positioning Reference Signal (PRS) is to be measured during the measurement gaps, an activation status of the measurement gaps, a presence of a type of the measurement gaps indicating whether the measurement gap is a preconfigured measurement gap, an absence of a type of the measurement gap indicating the measurement gap is always active and an indication whether the measurement gap is a network controlled small gap. Further, the method includes transmitting, by the RAN node, the RRC message with the additional IEs in the gap configuration of each of the measurement gap to a user equipment (UE) in the wireless network for configuration of the multiple measurement gaps. Further, the method includes receiving, by the RAN node, an RRC message comprising of one of an RRC Reconfiguration Complete or an RRC Resume Complete indicating successful application of the received measurement gap configuration from the UE.

The 3GPP is considering allowing multiple (concurrent) measurement gaps for performing various measurements for NR. In addition, pre-configuration of measurement gaps is also considered. The preconfigured gaps can be activated or deactivated later, for e.g. by network signaling. The 3GPP is also considering network controlled small gaps.

Unlike to the conventional methods and systems, the proposed method addresses how the network node can configure and release the UE with multiple measurement gaps and how the multiple gaps can be mapped to different measurement objects or different reference signals. The patent disclosure also address how the measurement gaps can be released by the UE using explicit signaling by the network and also autonomously by UE without using explicit signaling from the network. The patent disclosure also discuss how preconfigured gaps can be activated/deactivated and how NCSG can be activated/deactivated. The proposed method provides the optimal measurement gap configuration leading to increase the wireless network performance (e.g., NR performance or the like).

Referring now to the drawings and more particularly to FIGS. 1 to 19, where similar reference characters denote corresponding features consistently throughout the figures, there are shown preferred embodiments.

The principal object of the embodiments herein is to provide a method and a wireless network for supporting multiple measurement gaps in the wireless network. The proposed method provides the optimal measurement gap configuration leading to increase the wireless network performance (e.g., NR performance or the like).

Another object of the embodiments herein is to configure/release concurrent gaps in the wireless network.

Another object of the embodiments herein is to configure/release/activate/deactivate preconfigured measurement gaps in the wireless network.

Another object of the embodiments herein is to configure/release network controlled small gap (NCSG) in the wireless network.

Figure 1:
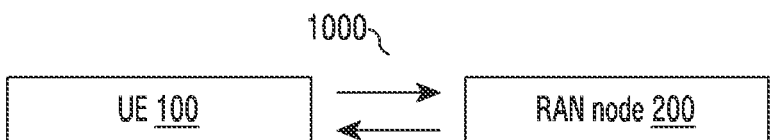
FIG. 1 illustrates an overview of a wireless network for supporting multiple measurement gaps, according to an embodiment of the disclosure.

FIG. 1 illustrates an overview of a wireless network (1000) for supporting multiple measurement gaps, according to an embodiment of the disclosure.

Referring to FIG. 1, the wireless network (1000) includes a UE (100) and a RAN node (200). The wireless network (1000) can be, for example, but not limited to a 5G network, an Open Radio Access Network (ORAN) or the like. The UE (100) can be, for example, but not limited to a cellular phone, a smart phone, a Personal Digital Assistant (PDA), a tablet computer, a laptop computer, an Internet of Things (IoT), embedded systems, edge devices, a vehicle to everything (V2X) device or the like. The RAN node (200) is also referred as a gNB, a gNB, a base station and a network entity in the patent disclosure.

The RAN node (200) creates an RRC message including one of an RRC Reconfiguration or an RRC Resume with additional IEs for configuration of the multiple measurement gaps. The additional IEs for each measurement gap comprises at least one of an identifier of each measurement gap, a mapping of the measurement gaps with a list of measurement objects, reference signals in a measurement object, where the measurement gaps are applicable, whether a PRS is to be measured during the measurement gaps, an activation status of the measurement gaps, a presence of a type of the measurement gaps indicating whether the measurement gap is a preconfigured measurement gap, an absence of a type of the measurement gap indicating the measurement gap is always active and an indication whether the measurement gap is a network controlled small gap. Further, the RAN node (200) transmits the RRC message with the additional IEs in the gap configuration of each of the measurement gap to the UE (100) for configuration of the multiple measurement gaps. The UE (100) receives the RRC message including one of the RRC Reconfiguration or the RRC Resume with the additional IEs in the gap configuration of the multiple measurement gaps from the RAN node (200). Based on the additional IEs, the UE (100) configures the multiple measurement gaps. Further, the UE (100) transmits the RRC message including one of RRC Reconfiguration Complete or RRC Resume Complete indicating successful application of the received configuration to the RAN node (200). Further, the RAN node (200) receives the RRC message comprising of one of the RRC Reconfiguration Complete or the RRC Resume Complete indicating successful application of the received measurement gap configuration from the UE (100).

In an embodiment, the UE (100) receives a measurement gap activation or deactivation indication from the RAN node (200) for activation or deactivation of the at least one preconfigured measurement gap from the multiple measurement gaps through one of the MAC CE and the DCI in the PDCCH. Based on one of the received MAC CE and the received DCI in the PDCCH, the UE (100) activates or deactivates the at least one preconfigured measurement gap from the multiple measurement gaps.

In an embodiment, the DCI is of a variable length, and where a length of the DCI in bits is equal to a number of preconfigured measurement gaps configured by an RRC message comprising one of RRC Reconfiguration or RRC Resume. Each of the bits in the DCI indicates at least one of the activation status of the measurement gaps, and toggling the current activation status of the measurement gaps with corresponding index identifier of the preconfigured measurement gap.

In an embodiment, the MAC CE comprises at least one of an activation status of the measurement gaps, wherein the activation status is represented by a predefined value for activation and another predefined value for deactivation or by toggling the bit at the corresponding index identifier of the preconfigured measurement gap. The predefined value is set at corresponding index identifier of the preconfigured measurement gap when the indexing is used.

In an embodiment, the UE (100) receives the RRC message for gap configuration from the RAN node (200). The RRC message including one of RRC Reconfiguration or RRC Resume for gap configuration includes the measurement gap release list to release one or more measurement gaps from the multiple measurement gaps. Based on the measurement gap release list, the UE (100) releases one or more measurement gaps from the multiple measurement gaps. Further, the UE (100) transmits the RRC message including one of RRC Reconfiguration Complete or RRC Resume Complete indicating the one or more measurement gaps are released successfully.

In an embodiment, the UE (100) determines at least one of switching of the reference signal in the measurement object (MO) to the type that doesn't need the measurement gap, release of measurement object by a RRC message or autonomously with MO is only associated to a report configuration with report-type set to condition trigger configuration, and release of the PRS. Further, the UE (100) determines that the any other MO or the PRS need the measurement gap. Further, the UE (100) determines whether the measurement gap is a preconfigured measurement gap. In an embodiment, the UE (100) releases the measurement gap in response to determining that the measurement gap is not needed for any other MO or the PRS and the measurement gap is not a preconfigured measurement gap and transmits a location measurement indication to indicate releasing of the measurement gap when the measurement gap is used for the PRS measurement. In another embodiment, the UE (100) deactivates the measurement gap in response to determining that the measurement gap is not needed for any other MO or the PRS and the measurement gap is a preconfigured gap and transmit the location measurement indication to indicate deactivation of the measurement gap when the measurement gap is used for the PRS measurement.

In an embodiment, the UE (100) selects the next PRACH occasion (PO). Further, the UE (100) determines that the selected PO is overlapping with at least one of the preconfigured measurement gap of the multiple measurement gaps. Further, the UE (100) determines whether the overlapping preconfigured measurement gap is activated. Further, the UE (100) transmits the PRACH preamble in the selected PRACH occasion in response to determining that the PO is not overlapping with any of the preconfigured measurement gap or none of the overlapping preconfigured measurement gap is activated. Further, the UE (100) selects next PRACH occasion in response to determining that the PO is overlapping with at least one of preconfigured measurement gap and at least one of the overlapping preconfigured measurement gap is activated.

In an embodiment, the UE (100) receives the RRC message including one of RRC Reconfiguration or RRC Resume from the RAN node (200) informing whether the UE (100) performs the autonomous measurement gap release or an autonomous activation or deactivation of the measurement gap. Further, the UE (100) sends the RRC message including one of RRC Reconfiguration complete or RRC Resume complete indicating that the provided information is received successfully to the RAN node (200). Based on the received RRC message, the UE (100) autonomously releases or activates or deactivates the measurement gap.

In an embodiment, the UE (100) receives the configuration from the RAN node (200) to report the network controlled small gap requirement. Further, the UE (100) sends one of an RRC Reconfiguration complete message or an RRC Resume complete message including a NeedForGaps information to the RAN node (200) indicating that a frequency band is measured using the network controlled small gaps.

In an embodiment, the UE (100) receives the RRC message including UE capability enquiry from the RAN node (200). Further, the UE (100) sends the RRC UE capability information message to the RAN node (200). The UE capability information message includes at least one of the support of the multiple measurement gaps, the number of the measurement gaps supported, and the support of preconfigured gaps of the multiple measurement gaps.

In an embodiment, the UE (100) determines whether the preconfigured measurement gap of the multiple measurement gaps is overlapping with the transmission opportunity for transmitting the scheduling request or the transport block to the RAN node (200). Further, the UE (100) determines whether the overlapping preconfigured measurement gap is activated in response to determining that the preconfigured measurement gap is overlapping with the transmission opportunity. Further, the UE (100) transmits the scheduling request or the transport block in response to determining that the preconfigured measurement gap is not overlapping with the transmission opportunity or the overlapping preconfigured measurement gap is not activated. Further, the UE (100) waits for the next transmission opportunity for transmitting the scheduling request or the transport block in response to determining that the preconfigured measurement gap is overlapping with the transmission opportunity and the overlapping preconfigured measurement gap is activated.

In an embodiment, the UE (100) detects an activation or deactivation of a configured SCG or SCell. Further, the UE (100) activates or deactivates at least one of the preconfigured measurement gaps of the multiple measurement gaps based on detection.

Configuration of multiple measurement gaps: In an example, for each measurement gap configured, the network entity (for e.g. gNB or the like) allocates the measurement gap-id and communicates the same to the UE (100). The network entity also provides a mapping of measurement gap with a list of measurement objects to the UE (100). In addition, the network entity informs the UE (100) if it needs to use the said measurement gap for all the configured reference signals in the measurement object or only for a subset of reference signals in the measurement object. In an embodiment, the UE (100) may identify the reference signal for which said measurement gap is used based on its own internal algorithms or configurations without the explicit communication from the network.

While configuring the measurement gap, the network entity (aka "RAN node") may also inform the UE (100) that this particular measurement gap can be used for PRS measurements. For a preconfigured gap, the network entity may also inform the UE (100) whether the gap is activated or deactivated. If there is no explicit communication about the activation status, the UE (100) may consider the gap to be activated or deactivated after configuration based on pre-specified behavior or based on its internal algorithms and settings.

An example configuration could be as given below—

```
GapConfig ::= SEQUENCE {
measgapId MeasGapId //integer,
measobjectIdList Sequence (1...max of measobjectId),
prsToBeMeasured bool,
activationStatus {enum {activated,deactivated}
gaptype {preconfigured}
gapOffset INTEGER (0..159),
mgl ENUMERATED {ms1dot5, ms3, ms3dot5, ms4, ms5dot5, ms6},
mgrp ENUMERATED {ms20, ms40, ms80, ms160},
mgta ENUMERATED {ms0, ms0dot25, ms0dot5},
}
```

The MeasgapId gives the identifier of the measurement gap. The MeasObjectIdList is a list of measurement objects which are mapped to this measurement gap. In this example case, the UE (100) considers that measurement gap is applicable to all the configured reference signals (SSB and CSI-RS). If the measurement-gap is applicable to only one of the given reference signals, it can be communicated within measobjectIdList or along with measobject configuration.

The PrsToBeMeasured tells the UE (100) whether the gap can be used for measuring PRS. This information could alternatively be communicated to the UE (100) along with PRS configuration-Network gives the measurement gap-id to be used along with PRS configuration. In the absence of explicit configuration, UE (100) may use any of the configured measurement gaps for measuring PRS.

The RAN node (200) sends such a list of gaps with one or more measurement gaps identified by MeasgapId. The RAN node (200) may also include a flag (gaptype) to indicate in the gap configuration that the gap is a preconfigured gap. Absence of the flag indicates that the gap is legacy gap, i.e. The gap is always activated once configured.

Activation of preconfigured measurement gaps can be done either through network configuration or autonomously by the UE (100) (and the network simultaneously).

The RAN node (200) may indicate the activation in the RRC message or L2 message or Downlink Control Information (DCI) (i.e. L1 signaling). For example, activation Status {enum {activated, deactivated}} in the RRC reconfiguration message can be used to indicate the activation status to the UE (100). Activation status could be configured through RRC Resume message also, in case the UE (100) is configured with measurement configuration or in case UE (100) autonomously activates the measurements after RRC Resume procedure.

MeasGap Activation/Deactivation MAC CE: In an example, the RAN node (200) also may activate or deactivate a preconfigured measurement gap through a MAC Control Element (CE). For e.g. a new MAC CE-MeasGap Activation/Deactivation MAC CE may be defined as below.

MeasGap Activation/Deactivation MAC CE in this example contains an octet, where each bit represents the activation/deactivation status of the corresponding gap. For e.g. if G0 is having a specific value (for e.g. 1), gap with gap-id 0 may be activated and if it is having other value (for e.g. 0), gap with gap-id 0 may be deactivated. Another option could be to use one value (for e.g. 1) for toggling the current gap activation status and another value (for e.g. 0) for keeping the current gap activation status.

| G7 | G6 | G5 | G4 | G3 | G2 | G1 | G0 |
|----|----|----|----|----|----|----|----|

MeasGap Activation/Deactivation by DCI: In an example, the RAN node (200) may also activate or deactivate a preconfigured measurement gap through DCI send in PDCCH. Any existing DCI format like Format 3_0 or Format 3_1 may be modified or a new DCI format X_Y may be defined for measurement gap activation/deactivation.

DCI may be of variable length—Length of the DCI in bits can be equal to the number of preconfigured measurement gaps configured by RRC. Potentially, unused bits in the DCI can be reserved e.g. for future use. Each bit may correspond to the activation status of a measurement gap. For example, bit 0 may correspond to the activation status of gap0, bit 1 may correspond to activation status of gap1. Alternately a bit value may instruct UE to keep/toggle the current activation status of gap with corresponding index/id. For e.g. value 0 may be for toggling and value 1 may be for keeping the current activation status. A sample structure for the DCI is given below.

| Field | Length | Reference |
|-------|--------|-----------|
| Activation status | variable | Bit i specifies if Gi is activated. Length i is the number of preconfigured gaps from the RRC Reconfiguration. |

The gNB may configure the UE (100) with a new RNTI for activation and deactivation of preconfigured measurement gap(s) through DCI. In an example, RNTI could be called MG-RNTI. In another embodiment, MG-RNTI may be pre-specified.

The gNB may configure MG-RNTI in the RRC messages like RRC reconfiguration, RRC setup or RRC resume. It may be sent in measgapconfig IE as shown in below:

```
GapConfig ::= SEQUENCE {
gapOffset INTEGER (0.. 159),
mgl ENUMERATED {ms1dot5, ms3, ms3dot5, ms4, ms5dot5, ms6},
```

-continued

```
mgrp ENUMERATED {ms20, ms40, ms80, ms160},
mgta ENUMERATED {ms0, ms0dot25, ms0dot5},
...,
[[
refServCellIndicator ENUMERATED {pCell, pSCell, mcg-FR2}
OPTIONAL -- Cond NEDCorNRDC
]],
[[
refFR2ServCellAsyncCA-r16 ServCellIndex OPTIONAL -- Cond
AsyncCA
]]
MG-RNTIRNTI-value
}
```

The UE (100) monitors PDCCH for DCI scrambled with MG-RNTI and if it gets any such DCI, the UE (100) activates or deactivates the measurement gaps as configured by the format DCI X_Y The UE (100) reports whether it needs gaps for a particular frequency band using "needforgap" mechanism as in NR Release 16. NeedForGap can be send in UL RRC messages like RRC Resume complete, RRC Reconfiguration Complete etc. The NeedForGapmay be extended for support of NCSG.

```
NeedForGapsNR-r16 ::= SEQUENCE {
bandNR-r16 FreqBandIndicatorNR,
gapIndication-r16 ENUMERATED {gap, no-gap,ncsg}
}
```

The UE (100) also may indicate the maximum number of gaps supported and/or whether concurrent gaps are supported and/or preconfigured gaps are supported. In an example, if the UE (100) indicates the number of measurement gaps supported is two, the UE (100) may support two per-UE gaps, one per-UE gap and one per-FR1 gap or one per-FR2 gap, two per-FR1 gaps, or two per-FR2gaps, but the UE (100) will not support two per-FR gaps and one per-UE gap. As in the current 3GPP specifications, the indication would be included in the RRC messages like NR UE Capability Information message.

Autonomous Release and Deactivation of Measurement gaps—When a measurement object is released or removed, the UE (100) identifies any measurement gap associated with the measurement object and verifies if said gap is associated with any other measurement object or with measurement of PRS. If there is no such measurement object or PRS which is associated with the gap, the UE (100) releases the measurement gap for normal measurement gaps. For preconfigured measurement gaps, the UE (100) may deactivate the gap or release the gap based on the configuration and/or its internal algorithms.

The measurement object release in the above embodiment may happen through RRC Reconfiguration message sent from gNB to UE (100). Alternately, the measurement object release in the above embodiment may happen autonomously if the measurement object is only associated to a reportconfig with report-type set to condTriggerConfig when any of the following cases happen.

The UE (100) performs cell selection after radio link failure,

The UE (100) receives RRC release with suspend config,

The UE (100) in RRC_INACTIVE state moves to RRC_IDLEstate, and

The UE (100) successfully completes a Random Access procedure after the reception of RRC reconfiguration and if reconfigurationWithSync was either included in spCellConfig of an MCG or was included in spCellConfig of an SCG and the CPC was configured.

When the PRS is released, the UE (100) removes any normal measurement gap associated with the PRS and not associated with any other measurement object. Similarly, for the preconfigured measurement gap, the UE (100) may deactivate the measurement gap or release the gap based on the configuration and/or its internal algorithms when PRS is released and gap is not associated with any measurement objects.

When the PRS measurements are stopped, a preconfigured gap which is mapped to the PRS and not to any measurement objects are deactivated. The UE (100) may transmit the LocationMeasurementIndication message to the RAN node (200) to indicate stopping of location related measurements which can indicate stopping of PRS measurements also If the reference signal associated with measurement object is changed from one type to another (SSB to CSI-RS or CSI-RS to SSB and/or one to other configuration within SSB or CSIRS reference signals) and the measurement gap is associated with only the old type (i.e. not associated with the new type) and there is no other measurement object or PRS associated with the measurement gap, the UE (100) removes the normal measurement gap. For a preconfigured gap, the UE (100) either deactivates the gap or removes the gap based on the configuration and/or the internal algorithm.

For preconfigured gaps, autonomous activation and deactivation can also be performed. One way of performing autonomous deactivation is on the removal of the measurement objects or the removal or deactivation of PRS as mentioned above. If a new measurement object is added which is mapped to the deactivated measurement gap, the said gap can be activated autonomously.

Preconfigured gaps can be also activated or deactivated based on whether gaps are needed for performing measurements.

The UE (100) may need a preconfigured measurement gap which is mapped to a measurement object for intra-frequency measurements in the same cell for one BWP (band width part) bwp1 and may not need the gaps for another BWP bwp2. When the UE (100) and network switches from bwp1 to bwp2 either through explicit signaling like DCI or on the expiry of a timer like BWP inactivity timer or through RRC signaling, preconfigured gap is automatically activated. Similarly, if the UE (100) and network switches from bwp2 to bwp1, the preconfigured gap is deactivated automatically.

In another case, the preconfigured gap may be deactivated when the SCell is deactivated, and may be activated again on SCell is activated. On receiving an instruction from network to activate a SCell through DCI/L2 CE/L3 message, the UE (100) activates the measurement gap mapped only to the same SCell measurements. Likewise, the UE (100) deactivates the measurement gaps when SCell is deactivated again.

In another case, the preconfigured gap may be deactivated when the SCG is deactivated, and may be activated again on SCG is activated. On receiving an instruction from network to activate a SCG through DCI/L2 CE/L3 message, the UE (100) activates the measurement gap mapped only to the same SCG measurements. Likewise, the UE (100) deactivates the measurement gaps when SCG is deactivated again.

In another embodiment, the pre-configured gap is continued when the SCell is deactivated or when the SCG is deactivated.

In another embodiment, the preconfigured gap configuration is stored and restored upon deactivation and activation respectively for the SCell and/or SCG.

In another embodiment, RAN node (200) may configure two measurement gaps where one may be configured with reduced periodicity but with the same measurement gap length. The RAN node (200) configures the UE (100) to activate the gap with reduced periodicity on SCG/SCell deactivation. The UE also deactivates the gap with higher periodicity on SCG/SCell deactivation. In other words, there will be switching between one preconfigured gaps to another. Likewise, when SCG/SCell is activated, the UE will activate the gap with higher periodicity and deactivates the gap with lower periodicity.

When a BWP is activated and the active BWP is a dormant BWP, the gNB may perform above stated switching method between gaps with same offset/gap length but different repetition periods. Even though the UE may perform RRM measurements in dormant BWP, the total amount of measurements required may be less due to relaxation in radio link monitoring and beam failure related measurements. Such relaxations could be configured by the network.

In an embodiment, relaxation of the measurement gap offset/gap length/repetition period based on the signal conditions and/or mobility conditions and/or location (e.g. near cell edge or otherwise) of the UE and may be configured by the RAN node (200) for different thresholds for different conditions.

In an embodiment, network may configure the UE (100) through RRC signaling whether it can perform autonomous measurement gap release or autonomous activation/deactivation.

Example specification extracts for Autonomous gap release and deactivation are given below—

Actions following cell selection while T311 is running

2>for each measId, if the associated reportConfig has a reportType set to condTriggerConfig:

3>for the associated reportConfigId:

4>remove the entry with the matching reportConfigId from the reportConfigList within the VarMeasConfig;

3>if the associated measObjectId is only associated to a reportConfig with reportType set to condTriggerConfig:

4>remove the entry with the matching measObjectId from the measObjectList within the VarMeasConfig;

5>if associated measurement gap is not associated to any other measurement object or PRS 6>If associated measurement gap is a preconfigured gap 7>deactivate the associated measurement gap 6>else 7>remove the entry with the matching measurementgapid from measgapList within VarMeasConfig 3>remove the entry with the matching measId from the measIdList within the VarMeasConfig;

Reception of the RRCRelease by the UE— if the RRCRelease includes suspendConfig:

apply the received suspendConfig;

remove all the entries within VarConditionalReconfig, if any;

2>for each measId, if the associated reportConfig has a reportType set to condTriggerConfig:

for the associated reportConfigId:

remove the entry with the matching reportConfigId from the reportConfigList within the VarMeasConfig;

3>if the associated measObjectId is only associated to a reportConfig with reportType set to condTriggerConfig:

4>remove the entry with the matching measObjectId from the measObjectList within the

21

VarMeasConfig;
if associated measurement gap is not associated to any other measurement object or PRS
If associated measurement gap is a preconfigured gap deactivate the associated measurement gap
6>else
7>remove the entry with the matching measurementgapid from measgapList within VarMeasConfig
3>remove the entry with the matching measId from the measIdList within the VarMeasConfig
UE actions upon going to RRC_IDLE—
for each measId, if the associated reportConfig has a reportType set to condTriggerConfig:
for the associated reportConfigId:
remove the entry with the matching reportConfigId from the reportConfigList within the VarMeasConfig;
2>if the associated measObjectId is only associated to a reportConfig with reportType set to condTriggerConfig:
remove the entry with the matching measObjectId from the measObjectList within the VarMeasConfig;
if associated measurement gap is not associated to any other measurement object or PRS
remove the entry with the matching measurementgapid from measgapList within VarMeasConfig
2>remove the entry with the matching measId from the measIdList within the VarMeasConfig;
Measurement object removal
for each measObjectId included in the received measObjectToRemoveList that is part of measObjectList in VarMeasConfig:
remove the entry with the matching measObjectId from the measObjectList within the VarMeasConfig;
if associated measurement gap is not associated to any other measurement object or PRS
If associated measurement gap is a preconfigured gap deactivate the associated measurement gap
3>else
4>remove the entry with the matching measurementgapid from measgapList within VarMeasConfig
Reception of an RRCReconfiguration by the UE:
2>if the reconfigurationWithSync was included in spCellConfig of an SCG and the CPC was configured
3>remove all the entries within VarConditionalReconfig, if any;
3>for each measId of the source SpCell configuration, if the associated reportConfig has a reportType set to condTriggerConfig:
4>for the associated reportConfigId:
remove the entry with the matching reportConfigId from the reportConfigList within the VarMeasConfig;
4>if the associated measObjectId is only associated to a reportConfig with reportType set to cho-TriggerConfig:
5>if associated measurement gap is not associated to any other measurement object or PRS
If associated measurement gap is a preconfigured gap deactivate the associated measurement gap
else
remove the entry with the matching measurementgapid from measgapList within VarMeasConfig
5>remove the entry with the matching measObjectId from the measObjectList within the VarMeasConfig;
Release of the Measurement gaps through network Signaling: In an example, the RAN node (200) may release one or more measurement gaps configured by signaling through RRC Reconfiguration. The gNB sends a list of measurement gaps to be removed. An example is shown below—
MeasGapToReleaseList Sequence (1 . . . maxMeasGap) of measGapId
When a measurement gap is released or deactivated by RRC signaling, the measurement objects or PRS associated with the measurement gap will not be removed/released. But they will be suspended and there will not be any measurements performed.

The RAN node (200) may configure or release NCSG using similar methods for configuration/release of multiple measurement gaps. Further, when NCSG is preconfigured, similar methods as preconfigured measurement gaps may be used for activation/deactivation.

MAC aspects of preconfigured gaps, multiple measurement gaps and NCSG, determination of PRACH occasion: In an example, after selecting SSB or CSI-RS during random access resource selection, the UE MAC selects the next available PRACH occasion. While determining PRACH occasion, the UE (100) checks if it falls within any measurement gap (any of the measurement gaps, preconfigured gap, NCSG). If it falls within a measurement gap and if the gap is not a preconfigured gap, UE skips the selected PRACH occasion and checks for the next available PRACH occasion. For a preconfigured gap, the UE checks the activation status of the measurement gap. If the preconfigured gap is not activated, the UE (100) selects the same PRACH occasion, else it selects the next PRACH occasion. The UE (100) doesn't consider any of the measurement gaps, preconfigured gap or NCSG during msg2 to msg4 of RACH procedure.

Scheduling Request (SR) transmission and Transport Block (TB) transmission: In an example, while transmitting SR or while generating transmission for a TB, UE MAC checks if there is any measurement gap. If there is no activated preconfigured gap or legacy gap or NCSG, the UE MAC instructs UE L1 for transmission, else it waits for the next transmission occasion.

Figure 2:
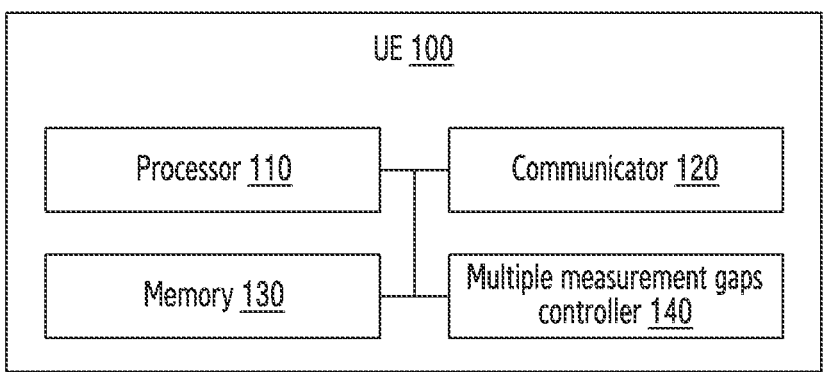
FIG. 2 shows various hardware components of a UE, according to an embodiment of the disclosure.

FIG. 2 shows various hardware components of the UE (100), according to an embodiment of the disclosure.

Referring to FIG. 2, the UE (100) includes a processor (110), a communicator (120), a memory (130) and a multiple measurement gaps controller (140). The processor (110) is coupled with the communicator (120), the memory (130) and the multiple measurement gaps controller (140). In addition, the operation of the multiple measurement gaps controller (140) may be performed by the processor (110).

The multiple measurement gaps controller (140) receives the RRC message including one of RRC Reconfiguration or RRC Resume with additional IEs in a gap configuration of the multiple measurement gaps from the RAN node (200). Based on the additional IEs, the multiple measurement gaps controller (140) configures the multiple measurement gaps. Further, the multiple measurement gaps controller (140) transmits an RRC message including one of RRC Reconfiguration Complete or RRC Resume Complete indicating successful application of the received configuration to the RAN node (200).

In an embodiment, the multiple measurement gaps controller (140) receives the measurement gap activation or deactivation indication from the RAN node (200) for activation or deactivation of the at least one preconfigured measurement gap from the multiple measurement gaps through one of the MAC CE and the DCI in the PDCCH. Based on one of the received MAC CE and the received DCI in the PDCCH, the multiple measurement gaps controller (140) activates or deactivates the at least one preconfigured measurement gap from the multiple measurement gaps.

In an embodiment, the multiple measurement gaps controller (140) receives the RRC message for gap configuration from the RAN node (200). The RRC message including one of RRC Reconfiguration or RRC Resume for gap configuration includes the measurement gap release list to release one or more measurement gaps from the multiple measurement gaps. Based on the measurement gap release list, the multiple measurement gaps controller (140) releases one or more measurement gaps from the multiple measurement gaps. Further, the multiple measurement gaps controller (140) transmits the RRC message including one of RRC Reconfiguration Complete or RRC Resume Complete indicating the one or more measurement gaps are released successfully.

In an embodiment, the multiple measurement gaps controller (140) determines at least one of switching of the reference signal in the measurement object (MO) to the type that doesn't need the measurement gap, release of measurement object by a RRC message or autonomously with MO is only associated to a report configuration with report-type set to condition trigger configuration, and release of the PRS. Further, the multiple measurement gaps controller (140) determines that the any other MO or the PRS need the measurement gap. Further, the multiple measurement gaps controller (140) determines whether the measurement gap is a preconfigured measurement gap. In an embodiment, the multiple measurement gaps controller (140) releases the measurement gap in response to determining that the measurement gap is not needed for any other MO or the PRS and the measurement gap is not a preconfigured measurement gap and transmits a location measurement indication to indicate releasing of the measurement gap when the measurement gap is used for the PRS measurement. In another embodiment, the multiple measurement gaps controller (140) deactivates the measurement gap in response to determining that the measurement gap is not needed for any other MO or the PRS and the measurement gap is a preconfigured gap and transmit the location measurement indication to indicate deactivation of the measurement gap when the measurement gap is used for the PRS measurement.

In an embodiment, the multiple measurement gaps controller (140) selects the next PRACH occasion (PO). Further, the multiple measurement gaps controller (140) determines that the selected PO is overlapping with at least one of the preconfigured measurement gap of the multiple measurement gaps. Further, the multiple measurement gaps controller (140) determines whether the overlapping preconfigured measurement gap is activated. Further, the multiple measurement gaps controller (140) transmits the PRACH preamble in the selected PRACH occasion in response to determining that the PO is not overlapping with any of the preconfigured measurement gap or none of the overlapping preconfigured measurement gap is activated. Further, the multiple measurement gaps controller (140) selects next PRACH occasion in response to determining that the PO is overlapping with at least one of preconfigured measurement gap and at least one of the overlapping preconfigured measurement gap is activated.

In an embodiment, the multiple measurement gaps controller (140) receives the RRC message including one of RRC Reconfiguration or RRC Resume from the RAN node (200) informing whether the UE (100) performs the autonomous measurement gap release or an autonomous activation or deactivation of the measurement gap. Further, the multiple measurement gaps controller (140) sends the RRC message including one of RRC Reconfiguration complete or RRC Resume complete indicating that the provided information is received successfully to the RAN node (200). Based on the received RRC message, the multiple measurement gaps controller (140) autonomously releases or activates or deactivates the measurement gap In an embodiment, the multiple measurement gaps controller (140) receives the configuration from the RAN node (200) to report the network controlled small gap requirement. Further, the multiple measurement gaps controller (140) sends one of an RRC Reconfiguration complete message or an RRC Resume complete message including a NeedForGaps information to the RAN node (200) indicating that a frequency band is measured using the network controlled small gaps.

In an embodiment, the multiple measurement gaps controller (140) receives the RRC message including UE capability enquiry from the RAN node (200). Further, the multiple measurement gaps controller (140) sends the RRC UE capability information message to the RAN node (200). The UE capability information message includes at least one of the support of the multiple measurement gaps, the number of the measurement gaps supported, and the support of preconfigured gaps of the multiple measurement gaps.

In an embodiment, the multiple measurement gaps controller (140) determines whether the preconfigured measurement gap of the multiple measurement gaps is overlapping with the transmission opportunity for transmitting the scheduling request or the transport block to the RAN node (200). Further, the multiple measurement gaps controller (140) determines whether the overlapping preconfigured measurement gap is activated in response to determining that the preconfigured measurement gap is overlapping with the transmission opportunity. Further, the multiple measurement gaps controller (140) transmits the scheduling request or the transport block in response to determining that the preconfigured measurement gap is not overlapping with the transmission opportunity or the overlapping preconfigured measurement gap is not activated. Further, the multiple measurement gaps controller (140) waits for the next transmission opportunity for transmitting the scheduling request or the transport block in response to determining that the preconfigured measurement gap is overlapping with the transmission opportunity and the overlapping preconfigured measurement gap is activated.

In an embodiment, the multiple measurement gaps controller (140) detects an activation or deactivation of a configured SCG or SCell. Further, the multiple measurement gaps controller (140) activates or deactivates at least one of the preconfigured measurement gaps of the multiple measurement gaps based on detection.

The multiple measurement gaps controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 2 shows various hardware components of the UE (100) but it is to be understood that other embodiments are not limited thereon. In other embodiments, the UE (100) may include a different number of components. Further, the labels or names of the components are used only for illustrative purpose and does not limit the scope of the disclosure. One or more components can be combined together to perform same or substantially similar function in the UE (100).

Figure 3:
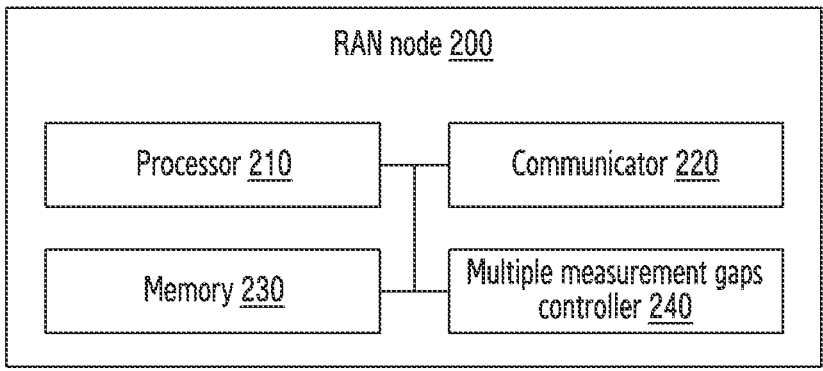
FIG. 3 shows various hardware components of a RAN node, according to an embodiment of the disclosure.

FIG. 3 shows various hardware components of the RAN node (200), according to an embodiment of the disclosure.

Referring to FIG. 3, the RAN node (200) includes a processor (210), a communicator (220), a memory (230) and a multiple measurement gaps controller (240). The processor (210) is coupled with the communicator (220), the memory (230) and the multiple measurement gaps controller (240). In addition, the operation of the multiple measurement gaps controller (240) may be performed by the processor (110).

The multiple measurement gaps controller (240) creates the RRC message including one of the RRC Reconfiguration or the RRC Resume with additional IEs for configuration of the multiple measurement gaps. Further, the multiple measurement gaps controller (240) transmits the RRC message with the additional IEs in the gap configuration of each of the measurement gap to the UE (100) for configuration of the multiple measurement gaps. Further, the multiple measurement gaps controller (240) receives the RRC message including of one of the RRC reconfiguration complete or an RRC resume complete indicating successful application of the received measurement gap configuration from the UE (100).

In an embodiment, the multiple measurement gaps controller (240) transmits the measurement gap activation or deactivation indication to the UE (100) for activation or deactivation of the at least one preconfigured measurement gap from the multiple measurement gaps through one of the MAC CE and the DCI in the PDCCH. Based on one of the transmitted MAC CE and the transmitted DCI, the multiple measurement gaps controller (240) activates or deactivates the at least one of preconfigured measurement gap from the multiple measurement gaps for the UE (100).

In an embodiment, the multiple measurement gaps controller (240) transmits the RRC message including one of RRC Reconfiguration or RRC Resume for gap configuration to the UE (100). The RRC message for gap configuration includes the measurement gap release list to release one or more measurement gaps from the multiple measurement gaps. Further, the multiple measurement gaps controller (240) receives the message including of one of RRC reconfiguration complete or RRC resume complete indicating the one or more measurement gaps are released successfully from the UE (100). Based on the measurement gap release list, the multiple measurement gaps controller (240) releases the one or more measurement gaps from the multiple measurement gaps.

In an embodiment, the multiple measurement gaps controller (240) sends the RRC message including one of RRC Reconfiguration or RRC Resume to the UE (100) informing whether the UE (100) performs autonomous measurement gap release or autonomous activation or deactivation of the measurement gap. Further, the multiple measurement gaps controller (240) receives the RRC message including one of RRC reconfiguration complete or the RRC Resume complete indicating the provided information is received successfully from the UE (100).

In an embodiment, the multiple measurement gaps controller (240) sends the configuration to the UE (100) to report a network controlled small gap requirement. Further, the multiple measurement gaps controller (240) receives one of an RRC Reconfiguration complete message or an RRC Resume complete message including a NeedForGaps information from the UE (100) indicating that the frequency band is measured using the network controlled small gaps.

In an embodiment, the multiple measurement gaps controller (240) sends the RRC message including the UE capability enquiry information to the UE (100). Further, the multiple measurement gaps controller (240) receives the RRC UE capability information from the UE (100). The UE capability information includes a support of the multiple measurement gaps, the number of the measurement gaps supported, and the support of preconfigured gaps of the multiple measurement gaps.

The multiple measurement gaps controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 3 shows various hardware components of the RAN node (200) but it is to be understood that other embodiments are not limited thereon. In other embodiments, the RAN node (200) may include a different number of components. Further, the labels or names of the components are used only for illustrative purpose and does not limit the scope of the disclosure. One or more components can be combined together to perform same or substantially similar function in the RAN node (200).

FIG. 4 is a flow chart (S400) illustrating a method, implemented by the RAN node (200), for supporting multiple measurement gaps in the wireless network (1000), according to an embodiment of the disclosure. The operations S402-S406 are handled by the multiple measurement gaps controller (240) or the processor (210, 2130).

At operation S402, the method includes creating the RRC message comprising one of the RRC Reconfiguration or the RRC Resume with additional IEs for configuration of the multiple measurement gaps. At operation S404, the method includes transmitting the RRC message with the additional IEs in the gap configuration of each of the measurement gap to the UE (100) in the wireless network (1000) for configuration of the multiple measurement gaps. At operation S406, the method includes receiving the RRC message comprising of one of the RRC Reconfiguration Complete or the RRC Resume Complete indicating successful application of the received measurement gap configuration from the UE (100).

FIG. 5 is a flow chart (S500) illustrating a method, implemented by the UE node (100), for supporting multiple measurement gaps in the wireless network (1000), according to an embodiment of the disclosure. The operations S502-S506 are handled by the multiple measurement gaps controller (140) or the processor (110, 2030).

At operation S502, the method includes receiving the RRC message comprising one of the RRC Reconfiguration or the RRC Resume with additional IEs in a gap configuration of the multiple measurement gaps from the RAN node (200) in the wireless network (1000). At operation S504, the method includes configuring the multiple measurement gaps based on the additional IEs. At operation S506, the method includes transmitting the RRC message comprising one of RRC Reconfiguration complete or RRC resume complete indicating successful application of the received configuration to the RAN node (200).

Figure 6:
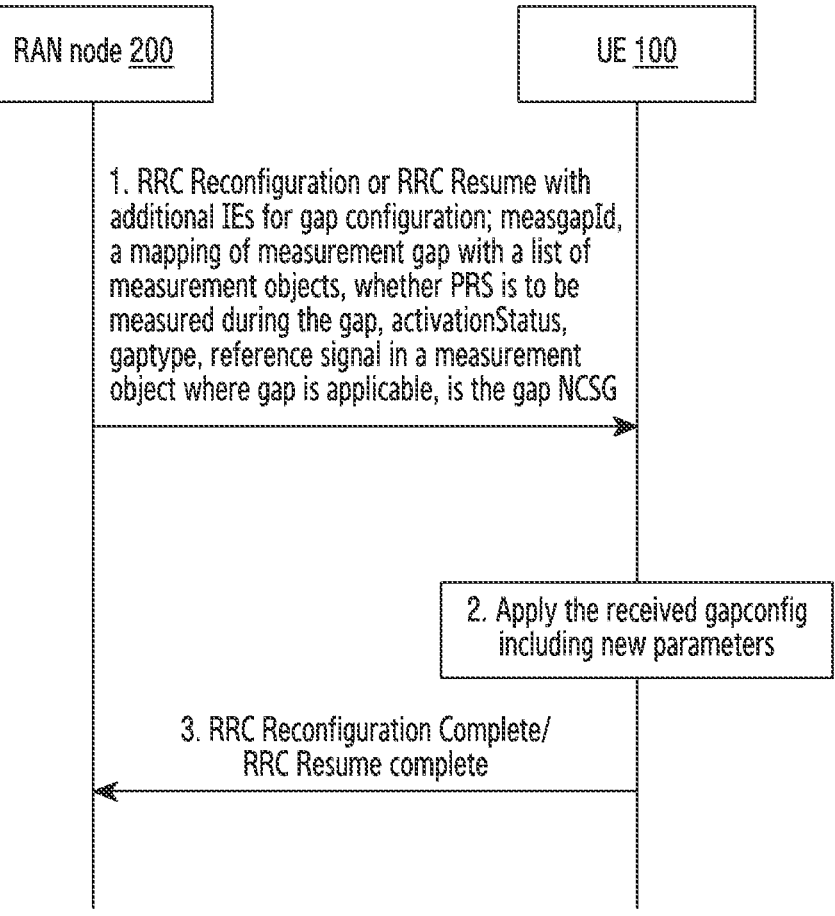
FIG. 6 illustrates an example scenario of configuration of multiple gaps and preconfigured gap, according to an embodiment of the disclosure.

FIG. 6 illustrates an example scenario of configuration of multiple gaps and preconfigured gap, according to an embodiment of the disclosure.

At 1, the RAN node (200) sends the RRC reconfiguration or RRC resume with additional IEs for gap configuration, measgapId, a mapping of measurement gap with a list of measurement objects, whether PRS is to be measured during the gap, activationStatus, gap type, reference signal in a measurement object where gap is applicable, is the gap NCSG to the UE (100). At 2, the UE (100) applies the received gapconfig including new parameters. At 3, the UE (100) sends the RRC Reconfiguration Complete/RRC Resume complete to the RAN node (200).

Figure 7:
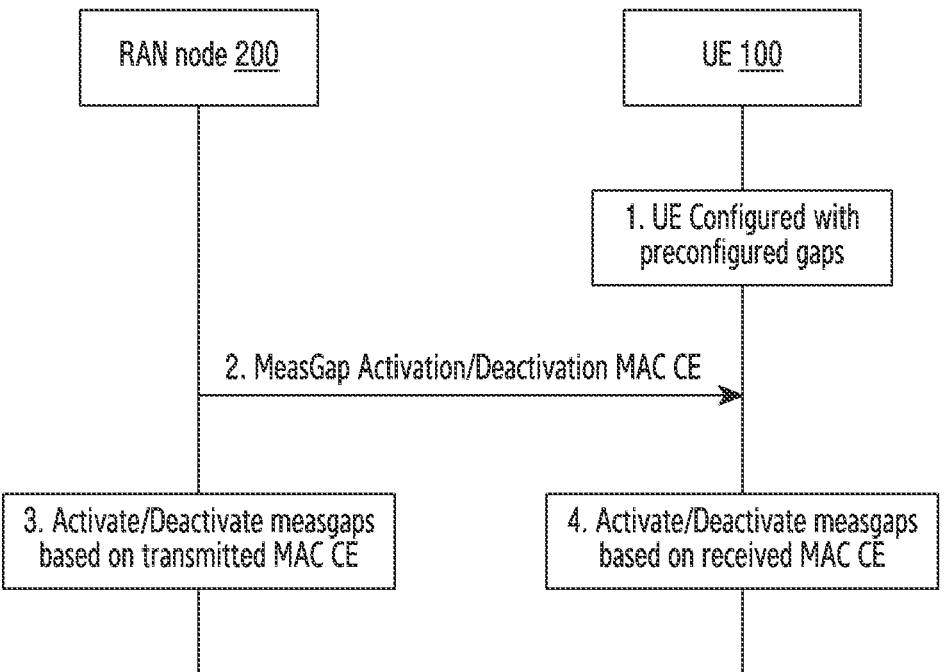
FIG. 7 illustrates an example scenario of activation/deactivation of preconfigured gap through a MAC-CE, according to an embodiment of the disclosure.

FIG. 7 illustrates an example scenario of activation/deactivation of preconfigured gap through the MAC-CE, according to an embodiment of the disclosure.

At 1, the UE (100) is configured with the preconfigured gaps. At 2, the RAN node (200) sends the MeasGap Activation/Deactivation MAC CE to the UE (100). At 3, the RAN node (200) activates/deactivates the measgaps based on transmitted MAC CE. At 4, the UE (100) activates/deactivates the measgaps based on the received MAC CE.

Figure 8:
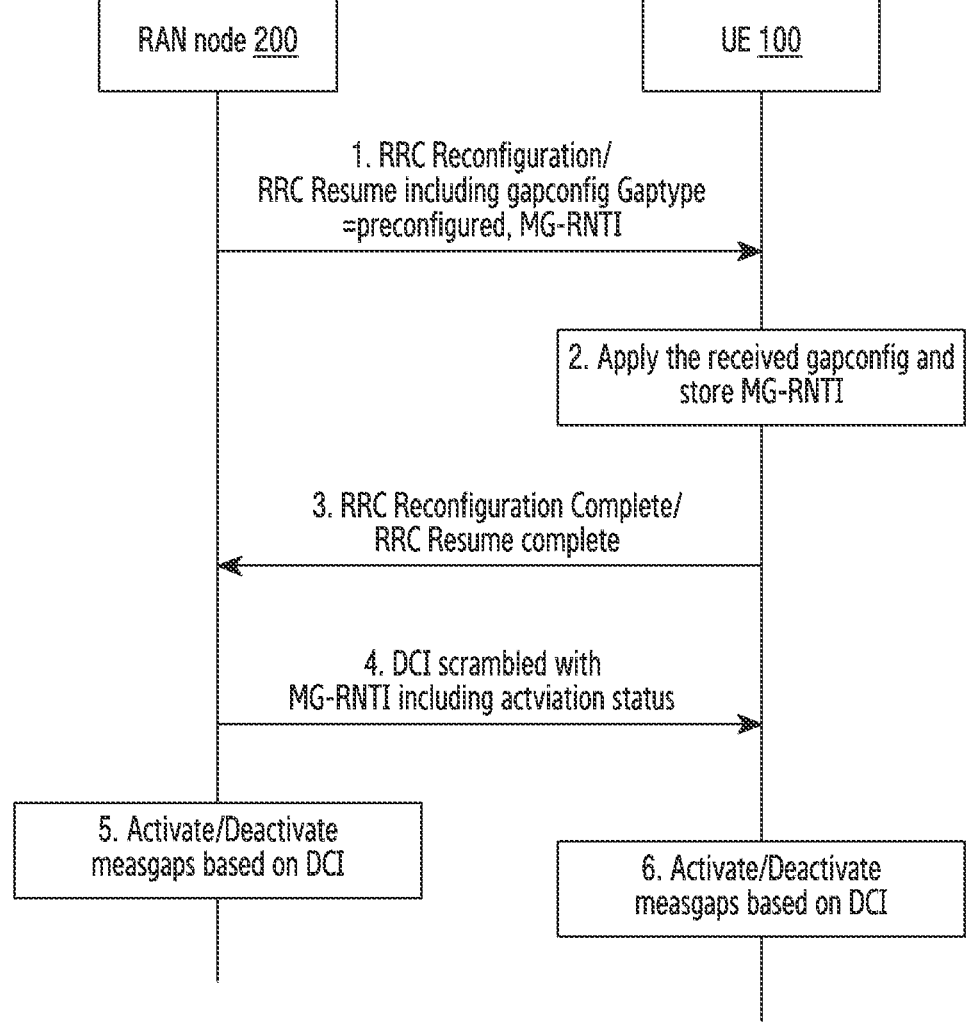
FIG. 8 illustrates an example scenario of activation/deactivation of preconfigured gap through a DCI, according to an embodiment of the disclosure.

FIG. 8 illustrates an example scenario of activation/deactivation of preconfigured gap through DCI, according to an embodiment of the disclosure.

At 1, the RAN node (200) sends an RRC Reconfiguration/RRC Resume including gapconfig Gaptype=preconfigured and MG-RNTI to the UE (100). At 2, the UE (100) applies the received gapconfig and stores MG-RNTI. At 3, the UE (100) sends the RRC Reconfiguration Complete/RRC Resume complete to the RAN node (200). At 4, the RAN node (200) sends the DCI scrambled with MG-RNTI including activation status to the UE (100). At 5, the RAN node (200) activates/deactivates the measgaps based on the DCI. At 6, the UE (100) activates/deactivates the measgaps based on the DCI FIG. 9 illustrates an example scenario of release of multiple measurement gaps by network, according to an embodiment of the disclosure.

At 1, the RAN node (200) sends the RRC Reconfiguration/RRC Resume gapconfig and MeasGapToReleaseList to the UE (100). At 2, the UE (100) releases the measurement gaps in the MeasGapToReleaseList. At 3, the UE (100) sends the RRC Reconfiguration Complete/RRC Resume complete to the RAN node (200). At 4, the RAN node (200) releases the measurement gaps in the MeasGapToReleaseList.

FIG. 10 illustrates an example scenario of configuration for autonomous activation/deactivation and autonomous release, according to an embodiment of the disclosure.

At 1, the RAN node (200) sends the RRC Reconfiguration/RRC Resume informing whether the UE (100) can perform autonomous measurement gap release or autonomous activation/deactivation of preconfigured gap to the UE (100). At 2, the UE (100) sends the RRC Reconfiguration Complete/RRC Resume complete to the RAN node (200). At 3, the UE (100) decides whether to perform autonomous measurement gap activation/deactivation or autonomous measurement gap release based on the received RRC Reconfiguration/RRC Resume.

FIG. 11 illustrates an example scenario (S1100) of autonomous release of measurement gaps, according to an embodiment of the disclosure. The operations S1102-S1114 are handled by the multiple measurement gaps controller (140).

At operation S1102, the method includes switching of the reference signal in the measurement object to a type that doesn't need gap. At operation S1104, the method includes releasing the measurement object by RRC message/autonomously with MO is only associated to a report config with report-type set to condTriggerConfig on specific cases. At operation S1106, the method includes releasing the PRS or transmitting LocationMeasurementIndication to indicate stopping of PRS measurements. At operation S1108, the method includes determining that any other MO or PRS does not need same gap. At operation S1110, the method includes determining whether the preconfigured gap is detected. If the preconfigured gap is detected then, at operation S1112, the method includes deactivating the measurement gap. If the preconfigured gap is not detected then, at operation S1114, the method includes releasing the measurement gap.

FIG. 12 illustrates an example scenario (S1200) of RACH preamble transmission with preconfigured gaps, according to an embodiment of the disclosure. The operations S1202-S1208 are handled by the multiple measurement gaps controller (140).

At operation S1202, the method includes selecting the next PRACH occasion and PO. At operation S1204, the method includes determining whether the PO is overlapping with preconfigured gap. If the PO is overlapping with preconfigured gap, at operation S1206, the method includes determining whether the overlapping gap is activated? If the overlapping gap is activated then, at operation S1202, the method includes selecting the next PRACH occasion and PO. If the overlapping gap is not activated and the PO is not overlapping with preconfigured gap then, at operation S1208, the method includes transmitting the RACH preamble.

FIG. 13 illustrates an example scenario (S1300) of UE informing a RAN node about a need for NCSG, according to an embodiment of the disclosure. The operations S1302 and S1304 are handled by the multiple measurement gaps controller (140).

At operation S1302, the method includes receiving the configuration from the RAN node (200) to report network controlled small gap requirement. At operation S1304, the method includes transmit to the network in NeedForGaps that the frequency band can be measured using network controlled small gaps in RRC Reconfiguration complete and RRC Resume complete.

FIG. 14 illustrates an example scenario of capability exchange for multiple gaps and preconfigured gap, according to an embodiment of the disclosure.

At 1, the RAN node (200) sends the RRC: UE capability enquiry to the UE (100). At 2, the UE (100) sends the RRC UE capability information including the support of multiple measurement gaps, the number of measurement gaps supported, and the support of preconfigured gaps to the RAN node.

FIG. 15 illustrates an example scenario (S1500) of scheduling request and transport block transmission with preconfigured gaps, according to an embodiment of the disclosure. The operations S1502-S1510 are handled by the multiple measurement gaps controller (140).

At operation S1502, the method includes providing the transmission opportunity to transmit the scheduling request or the transport block. At operation S1504, the method includes determining whether the preconfigured gap is there? If the preconfigured gap is not there then, at operation S1506, the method includes determining whether the gap is activated? the preconfigured gap is not there or the gap is not activated then, at operation S1508, the method includes transmitting the scheduling request or the transport block. If the gap is activated then, at operation S1510, the method includes waiting for the next transmission opportunity for transmitting scheduling request or transport block.

FIG. 16 illustrates an example scenario (S1600) of preconfigured gap activation with Scell, according to an embodiment of the disclosure.

The operations S1602 and S1604 are handled by the multiple measurement gaps controller (140). At operation S1602, the method includes determining that the Scell is activated. At operation S1604, the method includes activating the preconfigured gap.

FIG. 17 illustrates an example scenario (S1700) of preconfigured gap deactivation with Scell, according to an embodiment of the disclosure.

The operations S1702 and S1704 are handled by the multiple measurement gaps controller (140). At operation S1702, the method includes determining that the SCell is deactivated. At operation S1704, the method includes deactivating the preconfigured gap.

FIG. 18 illustrates an example scenario (S1800) of preconfigured gap activation with the SCG, according to an embodiment of the disclosure.

The operations S1802 and S1804 are handled by the multiple measurement gaps controller (140). At operation S1802, the method includes determining that the SCG is activated. At operation S1804, the method includes activating the preconfigured gap.

FIG. 19 illustrates an example scenario (S1900) of preconfigured gap deactivation with the SCG, according to an embodiment of the disclosure.

The operations S1902 and S1904 are handled by the multiple measurement gaps controller (140). At operation S1902, the method includes determining that the SCG is deactivated. At operation S1904, the method includes deactivating the preconfigured gap.

FIG. 20 is a block diagram of an internal configuration of a UE, according to an embodiment of the disclosure.

Referring to FIG. 20, the UE according to an embodiment may include a transceiver 2010, a memory 2020, and a processor 2030. The transceiver 2010, the memory 2020, and the processor 2030 of the UE may operate according to a communication method of the UE described above. However, the components of the UE are not limited thereto. For example, the UE may include more or fewer components than those described above. In addition, the processor 2030, the transceiver 2010, and the memory 2020 may be implemented as a single chip. Also, the processor 2030 may include at least one processor.

Furthermore, the UE may correspond to RAN node (100) of FIG. 2, the processor 2030 may correspond to processor 110 of FIG. 2, the transceiver 2010 may correspond to communicator 120 of FIG. 2 and the memory 2020 may correspond to memory 130 of FIG. 2.

The transceiver 2010 collectively refers to a UE receiver and a UE transmitter, and may transmit/receive a signal to/from a base station or a network entity. The signal transmitted or received to or from the base station or a network entity may include control information and data. The transceiver 2010 may include a RF transmitter for up-converting and amplifying a frequency of a transmitted signal, and a RF receiver for amplifying low-noise and down-converting a frequency of a received signal. However, this is only an example of the transceiver 2010 and components of the transceiver 2010 are not limited to the RF transmitter and the RF receiver.

Also, the transceiver 2010 may receive and output, to the processor 2030, a signal through a wireless channel, and transmit a signal output from the processor 2030 through the wireless channel The memory 2020 may store a program and data required for operations of the UE. Also, the memory 2020 may store control information or data included in a signal obtained by the UE. The memory 2020 may be a storage medium, such as read-only memory (ROM), random access memory (RAM), a hard disk, a compact disc read only memory (CD-ROM), and a digital versatile disc (DVD), or a combination of storage media.

The processor 2030 may control a series of processes such that the UE operates as described above. For example, the transceiver 2010 may receive a data signal including a control signal transmitted by the base station or the network entity, and the processor 2030 may determine a result of receiving the control signal and the data signal transmitted by the base station or the network entity.

FIG. 21 is a block diagram of an internal configuration of a base station, according to an embodiment of the disclosure.

Referring to FIG. 21, the base station according to an embodiment may include a transceiver 2110, a memory 2120, and a processor 2130. The transceiver 2110, the memory 2120, and the processor 2130 of the base station may operate according to a communication method of the base station described above. However, the components of the base station are not limited thereto. For example, the base station may include more or fewer components than those described above. In addition, the processor 2130, the transceiver 2110, and the memory 2120 may be implemented as a single chip. Also, the processor 2130 may include at least one processor.

Furthermore, the base station may correspond to RAN node (200) of FIG. 3, the processor 2130 may correspond to processor 210 of FIG. 3, the transceiver 2110 may correspond to communicator 220 of FIG. 3 and the memory 2120 may correspond to memory 230 of FIG. 3.

The transceiver 2110 collectively refers to a base station receiver and a base station transmitter, and may transmit/receive a signal to/from a terminal or a network entity. The signal transmitted or received to or from the terminal or a network entity may include control information and data. The transceiver 2110 may include a RF transmitter for up-converting and amplifying a frequency of a transmitted signal, and a RF receiver for amplifying low-noise and down-converting a frequency of a received signal. However, this is only an example of the transceiver 2110 and components of the transceiver 2110 are not limited to the RF transmitter and the RF receiver.

Also, the transceiver 2110 may receive and output, to the processor 2130, a signal through a wireless channel, and transmit a signal output from the processor 2130 through the wireless channel.

The memory 2120 may store a program and data required for operations of the base station. Also, the memory 2120 may store control information or data included in a signal obtained by the base station. The memory 2120 may be a storage medium, such as read-only memory (ROM), random access memory (RAM), a hard disk, a CD-ROM, and a DVD, or a combination of storage media.

The processor 2130 may control a series of processes such that the base station operates as described above. For example, the transceiver 2110 may receive a data signal including a control signal transmitted by the terminal, and the processor 2130 may determine a result of receiving the control signal and the data signal transmitted by the terminal.

Accordingly, the embodiment herein is to provide a method for supporting multiple measurement gaps in a wireless network (1000), wherein the method comprises: creating, by a radio access network node (RAN node) (200) in the wireless network (1000), a radio resource control (RRC) message comprising one of a RRC Reconfiguration or a RRC Resume with additional Information Elements (IEs) for configuration of the multiple measurement gaps, wherein the additional IEs for each measurement gap comprises at least one of an identifier of each measurement gap, a mapping of the measurement gaps with a list of measurement objects, reference signals in a measurement object, where the measurement gaps are applicable, whether a Positioning Reference Signal (PRS) is to be measured during the measurement gaps, an activation status of the measurement gaps, a presence of a type of the measurement gaps indicating whether the measurement gap is a preconfigured measurement gap, an absence of a type of the measurement gap indicating the measurement gap is always active and an indication whether the measurement gap is a network controlled small gap; transmitting, by the RAN node (200), the RRC message with the additional IEs in the gap configuration of each of the measurement gap to a user equipment (UE) (100) in the wireless network (1000) for configuration of the multiple measurement gaps; and receiving, by the RAN node (200), a RRC message comprising of one of a RRC Reconfiguration Complete or a RRC Resume Complete indicating successful application of the received measurement gap configuration from the UE (100).

In an embodiment, the method comprises: transmitting, by the RAN node (200), a measurement gap activation or deactivation indication to the UE (100) for activation or deactivation of the at least one preconfigured measurement gap from the multiple measurement gaps through one of a Medium Access Control-Control Element (MAC CE) and a Downlink Control Information (DCI) in a Physical Downlink Control Channel (PDCCH); and activating or deactivating, by the RAN node (200), the at least one of preconfigured measurement gap from the multiple measurement gaps for the UE (100) based on one of the transmitted MAC CE and the transmitted DCI.

In an embodiment, the DCI is of a variable length, and wherein the length of the DCI in bits is equal to a number of preconfigured measurement gaps configured by the RRC message comprising one of RRC Reconfiguration or RRC Resume, and wherein each of the bits in the DCI indicates at least one of the activation status of the measurement gaps, and toggling the current activation status of the measurement gaps with corresponding index identifier of the preconfigured measurement gap.

In an embodiment, the MAC CE comprises at least one of an activation status of the measurement gaps, wherein the activation status is represented by a predefined value for activation and another predefined value for deactivation or by toggling the bit at the corresponding index identifier of the preconfigured measurement gap, wherein the predefined value is set at corresponding index identifier of the preconfigured measurement gap.

In an embodiment, the method comprises: transmitting, by the RAN node (200), a RRC message comprising one of RRC Reconfiguration or RRC Resume for gap configuration to the UE (100), wherein the RRC message for gap configuration comprises a measurement gap release list to release one or more measurement gaps from the multiple measurement gaps; receiving, by the RAN node (200), a message comprising of one of RRC Reconfiguration Complete or RRC Resume Complete indicating the one or more measurement gaps are released successfully from the UE (100); and releasing, by the RAN node (200), the one or more measurement gaps from the multiple measurement gaps based on the measurement gap release list.

In an embodiment, the method comprises: sending, by the RAN node (200), a RRC message comprising one of RRC Reconfiguration or RRC Resume to the UE (100) informing whether the UE (100) performs autonomous measurement gap release or autonomous activation or deactivation of the measurement gap; and receiving, by the RAN node (200), a RRC message comprising one of RRC Reconfiguration complete or RRC Resume complete indicating the provided information is received successfully from the UE (100).

In an embodiment, wherein the method comprises: sending, by the RAN node (200), a configuration to the UE (100) to report a network controlled small gap requirement; and receiving, by the RAN node (200), one of an RRC Reconfiguration complete message or an RRC Resume complete message comprising a NeedForGaps information from the UE (100) indicating that a frequency band is measured using the network controlled small gaps.

In an embodiment, the method further comprises: sending, by the RAN node (200), a RRC message comprising UE capability enquiry information to the UE (100); and receiving, by the RAN node (200), a RRC UE capability information from the UE (100), wherein the UE capability Information comprises a support of the multiple measurement gaps, a number of the measurement gaps supported, and a support of preconfigured gaps of the multiple measurement gaps.

Accordingly, the embodiment herein is to provide method for supporting multiple measurement gaps in a wireless network (1000), wherein the method comprises: receiving, by a user equipment (UE) (100) in the wireless network (1000), a RRC message comprising one of RRC Reconfiguration or RRC Resume with additional Information Elements (IEs) in a gap configuration of the multiple measurement gaps from a RAN node (200) in the wireless network (1000), wherein the additional IEs for each measurement gap comprises at least one of an identifier of each measurement gap, a mapping of the measurement gaps with a list of measurement objects, reference signals in a measurement object where the measurement gaps are applicable, whether a PRS is to be measured during the measurement gaps, an activation status of the measurement gaps, a presence of a type of the measurement gaps indicating whether the measurement gap is a preconfigured measurement gap, an absence of a type of the measurement gap indicating the measurement gaps is always active and an indication whether the measurement gap is a network controlled small gap; configuring, by the UE (100), the multiple measurement gaps based on the additional IEs; and transmitting, by the UE (100), a RRC message comprising one of RRC Reconfiguration Complete or RRC Resume Complete indicating successful application of the received configuration to the RAN node (200).

In an embodiment, the method comprises: receiving, by the UE (100), a measurement gap activation or deactivation indication from the RAN node (200) for activation or deactivation of the at least one preconfigured measurement gap from the multiple measurement gaps through one of a MAC CE and a Downlink Control Information (DCI) in a Physical Downlink Control Channel (PDCCH); and activating or deactivating, by the UE (100), the at least one preconfigured measurement gap from the multiple measurement gaps based on one of the received MAC CE and the received DCI in the PDCCH.

In an embodiment, the DCI is of a variable length, and wherein the length of the DCI in bits is equal to a number of preconfigured measurement gaps configured by a RRC message comprising one of RRC Reconfiguration or RRC Resume, and wherein each of the bits in the DCI indicates at least one of the activation status of the measurement gaps, and toggling the current activation status of the measurement gaps with corresponding index identifier of the preconfigured measurement gap.

In an embodiment, wherein the MAC CE comprises at least one of an activation status of the measurement gaps, wherein the activation status is represented by a predefined value for activation and another predefined value for deactivation or by toggling the bit at the corresponding index identifier of the preconfigured measurement gap, wherein the predefined value is set at corresponding index identifier of the preconfigured measurement gap.

In an embodiment, wherein the method comprises: receiving, by the UE (100), a RRC message for gap configuration from the RAN node (200), wherein the RRC message comprising one of RRC Reconfiguration or RRC Resume for gap configuration comprises a measurement gap release list to release one or more measurement gaps from the multiple measurement gaps; releasing, by the UE (100), one or more measurement gaps from the multiple measurement gaps based on the measurement gap release list; and transmitting, by the UE (100), a RRC message comprising one of RRC Reconfiguration Complete or RRC Resume Complete indicating the one or more measurement gaps are released successfully.

In an embodiment, wherein the method comprises: determining, by the UE (100), at least one of switching of the reference signal in the measurement object (MO) to the type that doesn't need the measurement gap, release of measurement object by a RRC message or autonomously with MO is only associated to a report configuration with report-type set to condition trigger configuration, release of the PRS; determining, by the UE (100), that the any other MO or the PRS need the measurement gap; determining, by the UE (100), whether the measurement gap is a preconfigured measurement gap; and performing, by the UE (100), one of: releasing the measurement gap in response to determining that the measurement gap is not needed for any other MO or the PRS and the measurement gap is not a preconfigured measurement gap and transmitting a Location Measurement Indication to indicate releasing of the measurement gap when the measurement gap is used for the PRS measurement, and deactivating the measurement gap in response to determining that the measurement gap is not needed for any other MO or the PRS and the measurement gap is a preconfigured gap and transmitting a Location Measurement Indication to indicate deactivation of the measurement gap when the measurement gap is used for the PRS measurement.

In an embodiment, the method comprises: selecting, by the UE (100), the next Physical Random Access Channel (PRACH) occasion (PO); determining, by the UE (100), that the selected PO is overlapping with at least one of a preconfigured measurement gap of the multiple measurement gaps; determining, by the UE (100), whether the overlapping preconfigured measurement gap is activated; and transmitting, by the UE (100), the PRACH preamble in the selected PRACH occasion in response to determining that the PO is not overlapping with any of the preconfigured measurement gap or none of the overlapping preconfigured measurement gap is activated; or selecting by the UE (100), next PRACH occasion in response to determining that the PO is overlapping with at least one of preconfigured measurement gap and at least one of the overlapping preconfigured measurement gap is activated.

In an embodiment, wherein the method comprises: receiving, by the UE (100), a RRC message comprising one of RRC Reconfiguration or RRC Resume from the RAN node (200) informing whether the UE (100) performs an autonomous measurement gap release or an autonomous activation or deactivation of the measurement gap; sending, by the UE (100), a RRC message comprising one of RRC Reconfiguration complete or RRC Resume complete indicating that the provided information is received successfully to the RAN node (200); and autonomously releasing or activating or deactivating, by the UE (100), the measurement gap based on the received RRC message.

In an embodiment, wherein the method comprises: receiving, by the UE (100), a configuration from the RAN node (200) to report a network controlled small gap requirement; and sending, by the UE (100), one of a RRC Reconfiguration complete message or a RRC Resume complete message comprising a NeedForGaps information to the RAN node (200) indicating that a frequency band is measured using the network controlled small gaps.

In an embodiment, wherein the method comprises: receiving, by the UE (100), a RRC message comprising UE capability enquiry from the RAN node (200); and sending, by the UE (100), a RRC UE capability information message to the RAN node (200), wherein the UE capability information message comprises at least one of a support of the multiple measurement gaps, a number of the measurement gaps supported, and a support of preconfigured gaps of the multiple measurement gaps.

In an embodiment, wherein the method comprises: determining, by the UE (100), whether a preconfigured measurement gap of the multiple measurement gaps is overlapping with the transmission opportunity for transmitting a scheduling request or a transport block to the RAN node (200); determining, by the UE (100), whether the overlapping preconfigured measurement gap is activated in response to determining that the preconfigured measurement gap is overlapping with the transmission opportunity; transmitting, by the UE (100), the scheduling request or the transport block in response to determining that the preconfigured measurement gap is not overlapping with the transmission opportunity or the overlapping preconfigured measurement gap is not activated; and waiting for the next transmission opportunity for transmitting the scheduling request or the transport block in response to determining that the preconfigured measurement gap is overlapping with the transmission opportunity and the overlapping preconfigured measurement gap is activated.

In an embodiment, wherein the method comprises: detecting, by the UE (100), an activation or deactivation of a configured SCG or SCell; and activating or deactivating, by the UE (100), at least one of the preconfigured measurement gaps of the multiple measurement gaps based on detection.

Accordingly, the embodiment herein is to provide a radio access network node (RAN node) (200) for supporting multiple measurement gaps in a wireless network (1000), wherein the RAN node (200) comprises: a memory (230); a processor (210); and a multiple measurement gaps controller (240), communicatively coupled to the memory (230) and the processor (210), configured to: create a radio resource control (RRC) message comprising one of a RRC Reconfiguration or a RRC Resume with additional Information Elements (IEs) for configuration of the multiple measurement gaps, wherein the additional IEs for each measurement gap comprises at least one of an identifier of each measurement gap, a mapping of the measurement gaps with a list of measurement objects, reference signals in a measurement object, where the measurement gaps are applicable, whether a Positioning Reference Signal (PRS) is to be measured during the measurement gaps, an activation status of the measurement gaps, a presence of a type of the measurement gaps indicating whether the measurement gap is a preconfigured measurement gap, an absence of a type of the measurement gap indicating the measurement gap is always active and an indication whether the measurement gap is a network controlled small gap; transmit the RRC message with the additional IEs in the gap configuration of each of the measurement gap to a user equipment (UE) (100) in the wireless network (1000) for configuration of the multiple measurement gaps; and receive a RRC message comprising of one of a RRC Reconfiguration Complete or a RRC Resume Complete indicating successful application of the received measurement gap configuration from the UE (100).

In an embodiment, the multiple measurement gaps controller (240) is configured to: transmit a measurement gap activation or deactivation indication to the UE (100) for activation or deactivation of the at least one preconfigured measurement gap from the multiple measurement gaps through one of a Medium Access Control-Control Element (MAC CE) and a Downlink Control Information (DCI) in a Physical Downlink Control Channel (PDCCH); and activate or deactivate the at least one of preconfigured measurement gap from the multiple measurement gaps for the UE (100) based on one of the transmitted MAC CE and the transmitted DCI.

In an embodiment, the DCI is of a variable length, and wherein the length of the DCI in bits is equal to a number of preconfigured measurement gaps configured by the RRC message comprising one of RRC Reconfiguration or RRC Resume, and wherein each of the bits in the DCI indicates at least one of the activation status of the measurement gaps, and toggling the current activation status of the measurement gaps with corresponding index identifier of the preconfigured measurement gap.

In an embodiment, the MAC CE comprises at least one of an activation status of the measurement gaps, wherein the activation status is represented by a predefined value for activation and another predefined value for deactivation or by toggling the bit at the corresponding index identifier of the preconfigured measurement gap, wherein the predefined value is set at corresponding index identifier of the preconfigured measurement gap.

In an embodiment, the multiple measurement gaps controller (240) is configured to: transmit a RRC message comprising one of RRC Reconfiguration or RRC Resume for gap configuration to the UE (100), wherein the RRC message for gap configuration comprises a measurement gap release list to release one or more measurement gaps from the multiple measurement gaps; receive a message comprising of one of RRC Reconfiguration Complete or RRC Resume Complete indicating the one or more measurement gaps are released successfully from the UE (100); and release the one or more measurement gaps from the multiple measurement gaps based on the measurement gap release list.

In an embodiment, wherein the multiple measurement gaps controller (240) is configured to: send a RRC message comprising one of RRC Reconfiguration or RRC Resume to the UE (100) informing whether the UE (100) performs autonomous measurement gap release or autonomous activation or deactivation of the measurement gap; and receive a RRC message comprising one of RRC Reconfiguration complete or RRC Resume complete indicating the provided information is received successfully from the UE (100).

In an embodiment, the multiple measurement gaps controller (240) is configured to: send a configuration to the UE (100) to report a network controlled small gap requirement; and receive one of a RRC Reconfiguration complete message or a RRC Resume complete message comprising a NeedForGaps information from the UE (100) indicating that a frequency band is measured using the network controlled small gaps.

In an embodiment, wherein the multiple measurement gaps controller (240) is configured to: send a RRC message comprising UE capability enquiry information to the UE (100); and receive a RRC UE capability information from the UE (100), wherein the UE capability Information comprises a support of the multiple measurement gaps, a number of the measurement gaps supported, and a support of preconfigured gaps of the multiple measurement gaps.

Accordingly, the embodiment herein is to provide a user equipment (UE) (100) for supporting multiple measurement gaps in a wireless network (1000), wherein the UE (100) comprises: a memory (130); a processor (110); and a multiple measurement gaps controller (140), communicatively coupled to the memory (130) and the processor (110), configured to: receive a RRC message comprising one of RRC Reconfiguration or RRC Resume with additional Information Elements (IEs) in a gap configuration of the multiple measurement gaps from a RAN node (200) in the wireless network (1000), wherein the additional IEs for each measurement gap comprises at least one of an identifier of each measurement gap, a mapping of the measurement gaps with a list of measurement objects, reference signals in a measurement object where the measurement gaps are applicable, whether a PRS is to be measured during the measurement gaps, an activation status of the measurement gaps, a presence of a type of the measurement gaps indicating whether the measurement gap is a preconfigured measurement gap, an absence of a type of the measurement gap indicating the measurement gaps is always active and an indication whether the measurement gap is a network controlled small gap; configure the multiple measurement gaps based on the additional IEs; and transmit a RRC message comprising one of RRC Reconfiguration Complete or RRC Resume Complete indicating successful application of the received configuration to the RAN node (200).

In an embodiment, the multiple measurement gaps controller (140) is configured to: receive a measurement gap activation or deactivation indication from the RAN node (200) for activation or deactivation of the at least one preconfigured measurement gap from the multiple measurement gaps through one of a MAC CE and a Downlink Control Information (DCI) in a Physical Downlink Control Channel (PDCCH); and activate or deactivate the at least one preconfigured measurement gap from the multiple measurement gaps based on one of the received MAC CE and the received DCI in the PDCCH.

In an embodiment, the DCI is of a variable length, and wherein the length of the DCI in bits is equal to a number of preconfigured measurement gaps configured by a RRC message comprising one of RRC Reconfiguration or RRC Resume, and wherein each of the bits in the DCI indicates at least one of the activation status of the measurement gaps, and toggling the current activation status of the measurement gaps with corresponding index identifier of the preconfigured measurement gap.

In an embodiment, the MAC CE comprises at least one of an activation status of the measurement gaps, wherein the activation status is represented by a predefined value for activation and another predefined value for deactivation or by toggling the bit at the corresponding index identifier of the preconfigured measurement gap, wherein the predefined value is set at corresponding index identifier of the preconfigured measurement gap.

In an embodiment, the multiple measurement gaps controller (140) is configured to: receive a RRC message for gap configuration from the RAN node (200), wherein the RRC message comprising one of RRC Reconfiguration or RRC Resume for gap configuration comprises a measurement gap release list to release one or more measurement gaps from the multiple measurement gaps;

release one or more measurement gaps from the multiple measurement gaps based on the measurement gap release list; and transmit an RRC message comprising one of RRC Reconfiguration Complete or RRC Resume Complete indicating the one or more measurement gaps are released successfully.

In an embodiment, the multiple measurement gaps controller (140) is configured to: determine at least one of switching of the reference signal in the measurement object (MO) to the type that doesn't need the measurement gap, release of measurement object by a RRC message or autonomously with MO is only associated to a report configuration with report-type set to condition trigger configuration, release of the PRS; determine that the any other MO or the PRS need the measurement gap; determine whether the measurement gap is a preconfigured measurement gap; and perform one of: release the measurement gap in response to determining that the measurement gap is not needed for any other MO or the PRS and the measurement gap is not a preconfigured measurement gap and transmitting a Location Measurement Indication to indicate releasing of the measurement gap when the measurement gap is used for the PRS measurement, and deactivate the measurement gap in response to determining that the measurement gap is not needed for any other MO or the PRS and the measurement gap is a preconfigured gap and transmitting a Location Measurement Indication to indicate deactivation of the measurement gap when the measurement gap is used for the PRS measurement.

In an embodiment, the multiple measurement gaps controller (140) is configured to: select the next Physical Random Access Channel (PRACH) occasion (PO); determine that the selected PO is overlapping with at least one of a preconfigured measurement gap of the multiple measurement gaps; determine whether the overlapping preconfigured measurement gap is activated; and transmit the PRACH preamble in the selected PRACH occasion in response to determining that the PO is not overlapping with any of the preconfigured measurement gap or none of the overlapping preconfigured measurement gap is activated; or select next PRACH occasion in response to determining that the PO is overlapping with at least one of preconfigured measurement gap and at least one of the overlapping preconfigured measurement gap is activated.

In an embodiment, the multiple measurement gaps controller (140) is configured to: receive a RRC message comprising one of RRC Reconfiguration or RRC Resume from the RAN node (200) informing whether the UE (100) performs an autonomous measurement gap release or an autonomous activation or deactivation of the measurement gap; send a RRC message comprising one of RRC Reconfiguration complete or RRC Resume complete indicating that the provided information is received successfully to the RAN node (200); and autonomously release or activate or deactivate the measurement gap based on the received RRC message.

In an embodiment, the multiple measurement gaps controller (140) is configured to: receive a configuration from the RAN node (200) to report a network controlled small gap requirement; and send one of a RRC Reconfiguration complete message or a RRC Resume complete message comprising a NeedForGaps information to the RAN node (200) indicating that a frequency band is measured using the network controlled small gaps.

In an embodiment, the multiple measurement gaps controller (140) is configured to: receive a RRC message comprising UE capability enquiry from the RAN node (200); and send a RRC UE capability information message to the RAN node (200), wherein the UE capability information message comprises at least one of a support of the multiple measurement gaps, a number of the measurement gaps supported, and a support of preconfigured gaps of the multiple measurement gaps.

In an embodiment, the multiple measurement gaps controller (140) is configured to: determine whether a preconfigured measurement gap of the multiple measurement gaps is overlapping with the transmission opportunity for transmitting a scheduling request or a transport block to the RAN node (200); determine whether the overlapping preconfigured measurement gap is activated in response to determining that the preconfigured measurement gap is overlapping with the transmission opportunity; transmit the scheduling request or the transport block in response to determining that the preconfigured measurement gap is not overlapping with the transmission opportunity or the overlapping preconfig-ured measurement gap is not activated; and wait for the next transmission opportunity for transmitting the scheduling request or the transport block in response to determining that the preconfigured measurement gap is overlapping with the transmission opportunity and the overlapping preconfigured measurement gap is activated.

In an embodiment, the multiple measurement gaps con-troller (140) is configured to: detect an activation or deac-tivation of a configured SCG or SCell; and activate or deactivate at least one of the preconfigured measurement gaps of the multiple measurement gaps based on detection.

The various actions, acts, blocks, operations, or the like in the flow charts (S400, S500, S1100-S1300, and S1500-S1900) may be performed in the order presented, in a different order or simultaneously. Further, in some embodi-ments, some of the actions, acts, blocks, operations, or the like may be omitted, added, modified, skipped, or the like without departing from the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodi-ments. It is to be understood that the phraseology or termi-nology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

These and other aspects of the embodiments herein will be better appreciated and understood when considered in conjunction with the following description and the accom-panying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modi-fications.

The methods according to the embodiments described in the claims or the detailed description of the disclosure may be implemented in hardware, software, or a combination of hardware and software.

When the electrical structures and methods are imple-mented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodi-ments described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, com-pact disc-ROM (CD-ROM), a digital versatile disc (DVD), another type of optical storage device, or a magnetic cas-sette. Alternatively, the programs may be stored in a memory system including a combination of some or all of the above-mentioned memory devices. In addition, each memory device may be included by a plural number.

The programs may also be stored in an attachable storage device which is accessible through a communication net-work such as the Internet, an intranet, a local area network (LAN), a wireless LAN (WLAN), or a storage area network (SAN), or a combination thereof. The storage device may be connected through an external port to an apparatus accord-ing to the embodiments of the disclosure. Another storage device on the communication network may also be con-nected to the apparatus performing the embodiments of the disclosure.

In the afore-described embodiments of the disclosure, elements included in the disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illus-trate operational environments in which various user equip-ment features disclosed in this patent document can be used, these features can be used in any other suitable system.

While the disclosure has been shown and described with reference to various embodiments thereof, it will be under-stood by those skilled in the art that various changes in form and details may be made therein without departing from the spirit and scope of the disclosure as defined by the appended claims and their equivalents.

What is claimed is:

1. A user equipment (UE) in a wireless communication system, the UE comprising:
 a transceiver, and
 a controller coupled with the transceiver and configured to:
  transmit, to a base station, information indicating whether concurrent measurement gaps are sup-ported,
  receive, from the base station, a first radio resource control (RRC) message including gap configuration including at least one measurement gap configura-tion associated with the concurrent measurement gaps,
   wherein the at least one measurement gap configu-ration includes at least one of IDs of measurement gaps, and
   wherein a measurement gap is a period that the UE uses to perform measurement,
  identify that the at least one measurement gap configu-ration includes a first indication indicating that the measurement gap is a pre-configured measurement gap and a second indication indicating that the measurement gap is associated with a measurement on a positioning reference signal,
  receive, from the base station, a medium access control (MAC) control element (CE) indicating an activation or a deactivation of the pre-configured measurement gap, wherein the first indication and the second indication are used for measuring in the measurement gap, receive, from the base station, a second RRC message including a list of measurement gap configuration to be released, wherein the list includes at least one of IDs of measurement gaps to be released, and release at least one measurement gap configuration corresponding to the at least one of the IDs included in the list.

2. The UE of claim 1, wherein the at least one measurement gap configuration includes one of the first indication indicating that the measurement gap is the pre-configured measurement gap, the second indication indicating that the measurement gap is associated with the measurement on the positioning reference signal, or a third indication indicating that the measurement gap is a network controlled small gap (NCSG).

3. The UE of claim 1, wherein the controller is further configured to activate or deactivate the pre-configured measurement gap based on the gap configuration and the MAC CE.

4. The UE of claim 1, wherein the controller is further configured to:

transmit, to the base station, a third RRC message including information on a frequency band associated with an NCSG requirement, wherein the first RRC message or the second RRC message includes an RRC reconfiguration message or an RRC resume message, and wherein the third RRC message includes an RRC reconfiguration complete message or an RRC resume complete message.

5. The UE of claim 1, wherein the controller is further configured to:

transmit, to the base station, information indicating whether the pre-configured measurement gap is supported.

6. A base station in a wireless communication system, the base station comprising:

a transceiver, and a controller coupled with the transceiver and configured to:

receive, from a user equipment (UE), information indicating whether concurrent measurement gaps are supported, transmit, to the UE, a first radio resource control (RRC) message including gap configuration including at least one measurement gap configuration associated with the concurrent measurement gaps, wherein the at least one measurement gap configuration includes at least one of IDs of measurement gaps, wherein a measurement gap is a period that the UE uses to perform measurement, and wherein the at least one measurement gap configuration includes a first indication indicating that the measurement gap is a pre-configured measurement gap and a second indication indicating that the measurement gap is associated with a measurement on a positioning reference signal, and transmit, to the UE, a medium access control (MAC) control element (CE) indicating an activation or a deactivation of the pre-configured measurement gap, wherein the first indication and the second indication are used for measuring in the measurement gap, and transmit, to the UE, a second RRC message including a list of measurement gap configuration to be released, wherein the list includes at least one of IDs of measurement gaps to be released, and wherein at least one measurement gap configuration corresponding to the at least one of the IDs included in the list is released.

7. The base station of claim 6, wherein the at least one measurement gap configuration includes one of the first indication indicating that the measurement gap is the pre-configured measurement gap, the second indication indicating that the measurement gap is associated with the measurement on the positioning reference signal, or a third indication indicating that the measurement gap is a network controlled small gap (NCSG).

8. The base station of claim 6, wherein the pre-configured measurement gap is activated or deactivated based on the gap configuration and the MAC CE.

9. The base station of claim 6, wherein the controller is further configured to:

receive, from the UE, a third RRC message including information on a frequency band associated with an NCSG requirement, wherein the first RRC message or the second RRC message includes an RRC reconfiguration message or an RRC resume message, and wherein the third RRC message includes an RRC reconfiguration complete message or an RRC resume complete message.

10. The base station of claim 6, wherein the controller is further configured to:

receive, from the UE, information indicating whether the pre-configured measurement gap is supported.

11. A method performed by a user equipment (UE) in a wireless communication system, the method comprising:

transmitting, to a base station, information indicating whether concurrent measurement gaps are supported;

receiving, from the base station, a first radio resource control (RRC) message including gap configuration including at least one measurement gap configuration associated with the concurrent measurement gaps, wherein the at least one measurement gap configuration includes at least one of IDs of measurement gaps, and wherein a measurement gap is a period that the UE uses to perform measurement;

identifying that the at least one measurement gap configuration includes a first indication indicating that the measurement gap is a pre-configured measurement gap and a second indication indicating that the measurement gap is associated with a measurement on a positioning reference signal;

receiving, from the base station, a medium access control (MAC) control element (CE) indicating an activation or a deactivation of the pre-configured measurement gap, wherein the first indication and the second indication are used for measuring in the measurement gap;

receiving, from the base station, a second RRC message including a list of measurement gap configuration to be released, wherein the list includes at least one of IDs of measurement gaps to be released; and releasing at least one measurement gap configuration corresponding to the at least one of the IDs included in the list.

12. The method of claim 11, wherein the at least one measurement gap configuration includes one of the first indication indicating that the measurement gap is the pre-configured measurement gap, the second indication indicating that the measurement gap is associated with the measurement on the positioning reference signal, or a third indication indicating that the measurement gap is a network controlled small gap (NCSG).

13. The method of claim 11, further comprising:
activating or deactivating the pre-configured measurement gap based on the gap configuration and the MAC CE.

14. The method of claim 11, further comprising:
transmitting, to the base station, a third RRC message including information on a frequency band associated with an NCSG requirement,
wherein the first RRC message or the second RRC message includes an RRC reconfiguration message or an RRC resume message, and
wherein the third RRC message includes an RRC reconfiguration complete message or an RRC resume complete message.

15. The method of claim 11, further comprising:
transmitting, to the base station, information indicating whether the pre- configured measurement gap is supported.

16. A method performed by a base station in a wireless communication system, the method comprising:
receiving, from a user equipment (UE), information indicating whether concurrent measurement gaps are supported;
transmitting, to the UE, a first radio resource control (RRC) message including gap configuration information including at least one measurement gap configuration associated with the concurrent measurement gaps,
wherein the at least one measurement gap configuration includes at least one of IDs of measurement gaps,
wherein a measurement gap is a period that the UE uses to perform measurement, and
wherein the at least one measurement gap configuration includes a first indication indicating that the measurement gap is a pre-configured measurement gap and a second indication indicating that the measurement gap is associated with a measurement on a positioning reference signal;
transmitting, to the UE, a medium access control (MAC) control element (CE) indicating an activation or a deactivation of the pre-configured measurement gap, wherein the first indication and the second indication are used for measuring in the measurement gap; and
transmitting, to the UE, a second RRC message including a list of measurement gap configuration to be released, wherein the list includes at least one of IDs of measurement gaps to be released, and
wherein at least one measurement gap configuration corresponding to the at least one of the IDs included in the list is released.

17. The method of claim 16, wherein the at least one measurement gap configuration includes one of the first indication indicating that the measurement gap is the pre-configured measurement gap, the second indication indicating that the measurement gap is associated with the measurement on the positioning reference signal, or a third indication indicating that the measurement gap is a network controlled small gap (NCSG).

18. The method of claim 16, wherein the pre- configured measurement gap is activated or deactivated based on the gap configuration and the MAC CE.

19. The method of claim 16, further comprising:
receiving, from the UE, a third RRC message including information on a frequency band associated with an NCSG requirement,
wherein the first RRC message or the second RRC message includes an RRC reconfiguration message or an RRC resume message, and
wherein the third RRC message includes an RRC reconfiguration complete message or an RRC resume complete message.

20. The method of claim 16, further comprising:
receiving, from the UE, information indicating whether the pre-configured measurement gap is supported.

* * * * *